United States Patent [19]
Busch et al.

[11] Patent Number: 5,987,613
[45] Date of Patent: Nov. 16, 1999

[54] PORTABLE COMPUTER WITH TIME-SENSITIVE TRI-MODAL POWER MANAGEMENT SWITCH

[75] Inventors: John P. Busch; Gregory N. Stewart, both of Austin, Tex.

[73] Assignee: Dell Computer Corporation, Round Rock, Tex.

[21] Appl. No.: 08/360,194

[22] Filed: Dec. 20, 1994

Related U.S. Application Data

[63] Continuation of application No. 08/131,109, Oct. 4, 1993, abandoned, which is a continuation of application No. 07/655,619, Feb. 14, 1991, abandoned.

[51] Int. Cl.⁶ .................................................. G06F 13/00
[52] U.S. Cl. ............................................................ 713/300
[58] Field of Search ........................ 364/DIG. 1, DIG. 2; 307/46, 48, 52, 62, 66, 80; 395/575, 725, 750, 800

[56] References Cited

U.S. PATENT DOCUMENTS 4,980,836  12/1990  Carter et al. .............................. 395/750

*Primary Examiner*—Robert B. Harrell
*Attorney, Agent, or Firm*—Akin, Gump, Strauss, Hauer & Feld, L.L.P.

[57] ABSTRACT

A portable computer in which a single switch is positioned to be closed when the case is closed, and also to be readily operable by the user's finger. Software polls the switch. If the switch is briefly depressed, the software detects that the user is requesting entry into standby mode, and accordingly powers down certain input/output functions until new stimulus is received. If the switch is held down for a long time by the user closing the case cover, or manually holding the button down for a long time, the software causes the system to enter sleep mode (its lowest power mode).

38 Claims, 27 Drawing Sheets

MILES Slave Cycle State Machine, (AT is Master)

MILES Master, (Exception Cycle), State Machine, (AT is Slave)

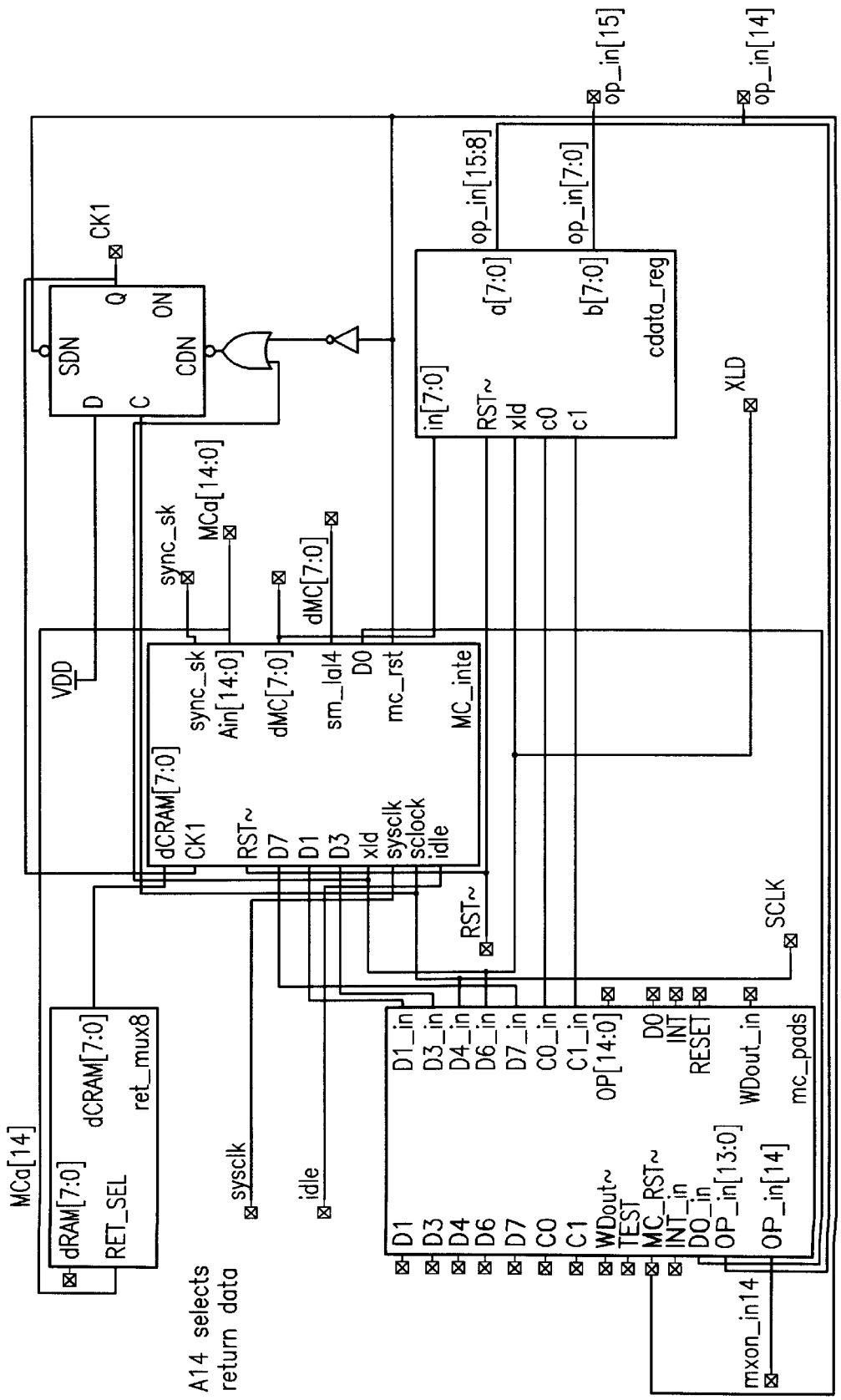
FIG. 6A  MILES MICRO_CONTROLLER SERIAL INTERFACE

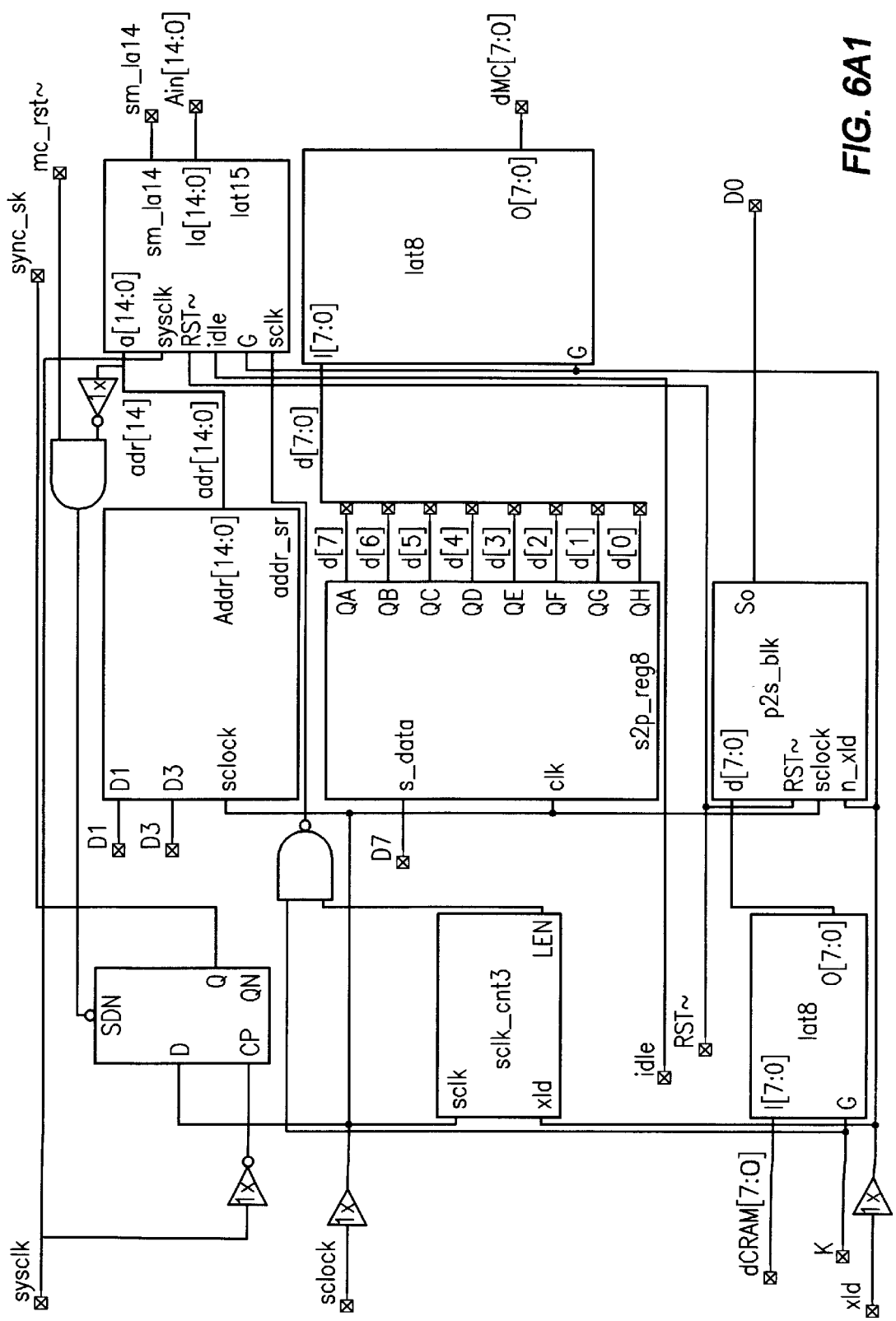
FIG. 6A1

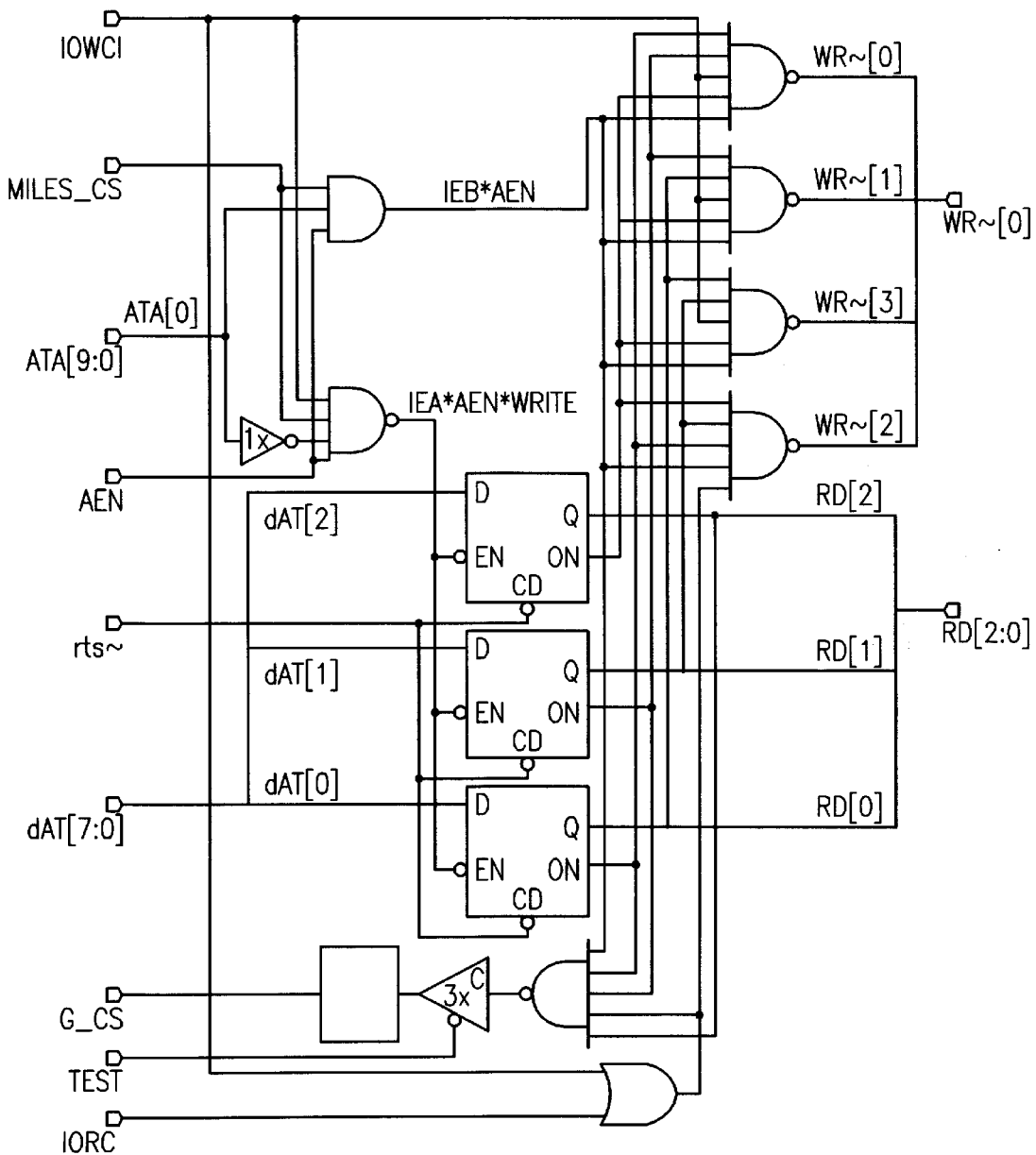
*FIG. 6B1*

PORTABLE COMPUTER WITH TIME-SENSITIVE TRI-MODAL POWER MANAGEMENT SWITCH

This is a continuation of application Ser. No. 08/131,109 filed on Oct. 4, 1993, abandoned which is a continuation of Ser. No. 07/655,619 filed on Feb. 14, 1991, now abandoned.

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO RELATED APPLICATIONS

The following applications of common assignee contain at least some drawings in common with the present application, and are believed to have effective filing dates identical with that of the present application, and are all hereby incorporated by reference:

Ser. No. 07/655,889, filed Feb. 14, 1991, entitled "Portable Computer with BIOS-Independent Power Management" (DC-00172), now U.S. Pat. No. 5,410,711;

Ser. No. 07/656,265, filed Feb. 14, 1991, entitled "Rechargeable System with Separate Battery Circuits in a Common Module" (DC-00173), now abandoned;

Ser. No. 07/656,647, filed Feb. 14, 1991, entitled "Portable Computer System with Adaptive Power-Control Parameters" (DC-00174), now abandoned; and Ser. No. 07/656,262, filed Feb. 14, 1991, entitled "Method for Detecting Low Battery State Without Precise Calibration" (DC-00180), now U.S. Pat. No. 5,268,845; all of which are hereby incorporated by reference.

BACKGROUND AND SUMMARY OF THE INVENTION

The present invention relates to portable battery-powered computers.

The Ongoing Downsizing of Portable Personal Computers

Portable personal computers were introduced in the early 1980s, and proved to be very useful and popular. As this market has developed, it has become increasingly clear that users strongly desire systems to have small volume, small weight, and long battery-powered lifetime. Thus, small portable computers ("laptop" computers) have proven extremely popular during the late 1980s. Users continue to demand more features, longer time between recharges, and lower weight and volume. This combination of demands is difficult to meet. Moreover, as of 1990, another smaller generation of portable computers has begun to appear, referred to as "notebook" computers. This smaller form factor will only exacerbate the difficulty of the above tradeoffs.

Approaches to Power Conservation

There are three basic approaches to extending the operating lifetime of a portable computer. The simplest way is to specify components at the lowest economical power consumption. Thus, for instance, CMOS integrated circuits and liquid crystal displays (LCDs) will normally be used. An equally simple way is to increase battery capacity. However, both of these routes rapidly encounter limits, which are set simply by the tradeoff of the cost of lower-power components, or of the elimination of functionality, with user expectations.

The third way is to use power-management algorithms so that, at almost every instant, all components are being operated in the lowest-power mode for their current demands. Thus, for example, a processor which is not currently executing a program may be placed into "sleep" mode, to reduce its overall power consumption. For another example, substantial power savings can be achieved simply by stopping the system clock (or by slowing down the system clock to a very low rate). For another example, it is common practice, in portable computers with an LCD display, to provide backlighting for use of the display under low-light conditions; but. since this backlighting consumes relatively large amounts of power, it will normally be turned off after a short period of inactivity (or even, alternatively, after a short duration regardless of activity), until the user again demands backlighting.

All of these lines of approach have some inherent limits. For example, it is hard to foresee any integrated circuit technology which would be economical in the 1990s and more power-efficient than low-power low-voltage CMOS. Some further improvement in this area is foreseeable, but no revolutionary improvements appear likely. Moreover, in practice, such improvements are largely outside the control of system designers: when lower-power chips are sampled, system design houses will buy them; but system design houses cannot greatly accelerate the pace of introduction of such chips.

It is also true that the smartest power-management programs cannot reduce the time fraction during which the user wishes to look at the display, or enter data through the keyboard. However, in this area there does appear to be room for improvement, and system design improvements can help achieve power efficiency.

Many power management schemes have been proposed, where parts of the system are shut down during periods of inactivity[1]. These approaches tend to extend the usable working time between recharges.

[1]One example of a portable computer system with power-monitoring functions is described in U.S. Pat. No. 4,980,836 to Carter et al., which is hereby incorporated by reference. Another source of proposed teachings regarding power-management functions is provided by the DS1227 product preview, contained in the 1988 data book of Dallas Semiconductor Corporation, which is hereby incorporated by reference.

In addition, it has been recognized that management of the charging and discharging cycles of Ni-Cd batteries can help to extend their life.

Either of these power-management functions requires some intelligent control. The conventional way to implement this has been using the main microprocessor (CPU). To accomplish this, the necessary program steps are inserted into the BIOS software (basic input/output system software), which is stored in ROM.

The Use of Standby Modes

Laptop computer systems will typically have an automatic power-down function. Since some of the components use significant power, even when no computation or input is occurring, the system will send itself into a standby or sleep mode if the user has not provided any input for a given period of time (e.g. 30 seconds or five minutes). (Sleep mode may not normally be entered, however, if new information is still being written to the display.)

There are various enhancements which have been proposed to the scheme. For example, it may be desirable to blank the display after a certain length of inactivity and shut down the system clock only after an additional length of inactivity.

Thus, there may be more than one reduced-power mode. For example, in the presently preferred embodiment a "standby" mode is used to transiently power-down subsystems (such as the display or the hard disk) without stopping the CPU. For deeper inactivity, a "sleep" mode can also be entered, in which nearly all functions of the system are turned off. From the standpoint of power consumption, entering sleep mode is almost the same as turning a conventional nonportable machine off (except that data will not be lost).

Commanding Entry into a Reduced-Power Mode

Most Laptop or Notebook computers that feature a Standby, Sleep, or Resume mode (e.g. Compaq's SLT and LTE families, most of the Toshiba portable family, and the Dell 316 and 320LT) have a Standby Button which, when pushed, puts the computer into Standby Mode. In the standard implementation, there is a separate Sleep Button and "case-closed" sensor (although on some of the less expensive or smallest units, the case-closed sensor may be left off completely), and the Sleep Button only recognizes one mode of push, regardless of the push duration.

By using two button/microswitch devices, more PCB real estate is required, more cost is added, and reliability is not as good, because one device depends on the other for proper activation of the Standby Mode. In this way, if either device fails, the Standby Mode will not be activated during case closure.

For example, the Dell 316 and 320 LT Laptop computers (which have a larger available volume than the "notebook" computer of the presently preferred embodiment) include a "case-closed" microswitch, separate from the button used to control entry into standby mode. This microswitch (located under the latch flap), was tripped whenever the screen was lowered and latched into position. The following events would then happen:

a) The screen's backlight was turned off.

b) A beeper was sounded to alert the user of "case-closed while ON" condition.

c) A power saving mode was entered, slowing down the processor, and turning off all unnecessary features.

In addition to this case-closing microswitch, a separate Standby Button was located adjacent to the keyboard area. This Standby Button was only accessible when the computer screen was opened. When this button was depressed (regardless of the duration) a Standby Mode would be entered until the button was depressed a second time, "waking up" the computer from Standby (also called Sleep) Mode.

In very small "notebook"-size computers, the amount of available circuit board space is very small. Each physical switch consumes board space for its connector. Moreover, each switch or button will itself require a nonzero volume, and this volume may become significant in relation to a very small total system volume.

Portable Computer with Dual-Purpose Standby Switch

The present invention provides a mechanism for efficiently controlling transitions into or out of either of two reduced-power states, using a single pushbutton. The button is positioned to be depressed either by closing the case, or by a push from the user's finger. The significance of a button signal is detected by monitoring HOW the button is pushed: a simple time computation determines whether the button's depression is momentary or extended. The appropriate mode transition can then be made.

This configuration provides an input to control activation or deactivation of a "Standby" mode during normal computer usage, while also detecting a "case-closed" condition. This modified button device replaces two separate devices—one button, and one microswitch—in more standard portable implementations.

The disclosed innovations provide a notebook computer in which the case-closed microswitch, and the Standby button, are replaced by a single button. This single button can be pressed by the user whenever the case is open. This button is positioned so that it will be held down whenever the case's cover is closed.

In the presently preferred embodiment, the combined button has a cam-like surface, for better mechanical interface with the case cover.

A software procedure polls the state of this combined button. By monitoring the duration during which the button stays down, the system can distinguish between a user pushing the Standby Button while the case is opened (momentary push) or a user closing the case while the computer is still on (an extended push—greater than some software-definable period of time). Thus, the software can detect the need for a transition into or out of the appropriate reduced-power state, depending on HOW the button is pushed.

A momentary push tells the software to put the unit into Standby until another momentary push is encountered, after which the computer will "wake up" to continue normal operation.

An extended push tells the software to put the system into a "sleep" mode, which provides the greatest possible power conservation (without loss of data). In this case the system remains in sleep mode until the Button is released, at which point the system would "wake up" to continue normal operation.

Of course, the system may have only the "sleep" or only the "standby" mode. In that case, the momentary push (off) has the same effect as closing the case of cause the system to go into the "sleep" or "standby" mode.

In the presently preferred embodiment, the duration threshold for distinguishing a momentary push from an extended push is preferably software-programmable.

Some significant advantages of the present invention include:

a) Saves space by combining two devices into one.

b) Saves cost by eliminating one microswitch per unit.

c) Improves reliability by combining two interdependent devices into one.

This disclosed invention is especially advantageous in Notebook-size computers, since they inherently have the on-board "intelligence" to distinguish HOW the button was pushed, and because full-function computing devices are getting smaller, more cost-sensitive, and greater reliability is demanded—and this device helps to satisfy all of these conditions.

BRIEF DESCRIPTION OF THE DRAWING

The present invention will be described with reference to the accompanying drawings, which show important sample embodiments of the invention and which are incorporated in the specification hereof by reference, wherein:

FIG. 6A is a diagram of the MC_TOP block shown in FIG. 6, and

FIG. 6A-1 is a diagram of the MC_intfc block shown in FIG. 6A.

FIG. 6B-1 is a diagram of the index block shown in FIG. 6B.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Overall Organization

The presently preferred embodiment provides a 80C286 or 386SX laptop computer, with hard disk and LCD display, powered by rechargeable Ni-Cd batteries and a nonrechargeable lithium battery.

Physical Conformation

FIGS. 8A–8J show various views of the external physical appearance of the portable laptop computer of the presently preferred embodiment. This provides a "laptop" computer, which can provide the full power of a normal personal computer for several hours of operation between battery recharges. This is a "notebook" size laptop computer, measuring approximately 8.5×11×2 inches, in the presently preferred embodiment. Weight, cost and power consumption ae important considerations in such products.

Figure 8A:
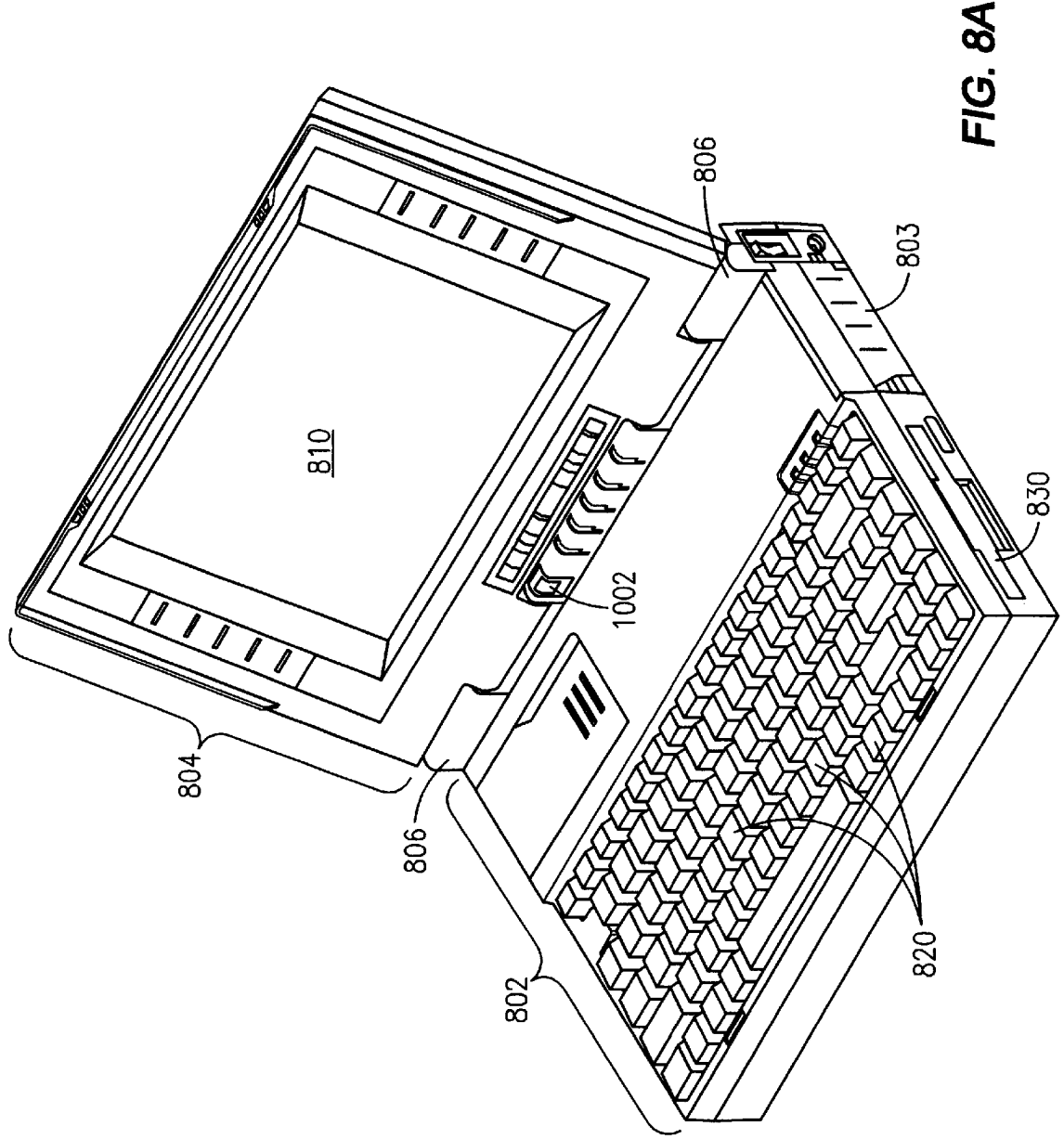
FIGS. 8A, 8B, 8C, 8D, 8E, 8F, 8G, 8H, 8I, and 8J show various views of the external physical appearance of the portable laptop computer of the presently preferred embodiment.

FIG. 8A shows a perspective view of the notebook computer of the presently preferred embodiment in the open position. Visible elements include case 802, cover 804, hinges 806, display screen 810, keyboard 820, floppy disk drive 830, and battery door 803 (which covers the receptacle for the rechargeable battery pack).

Figure 8B:
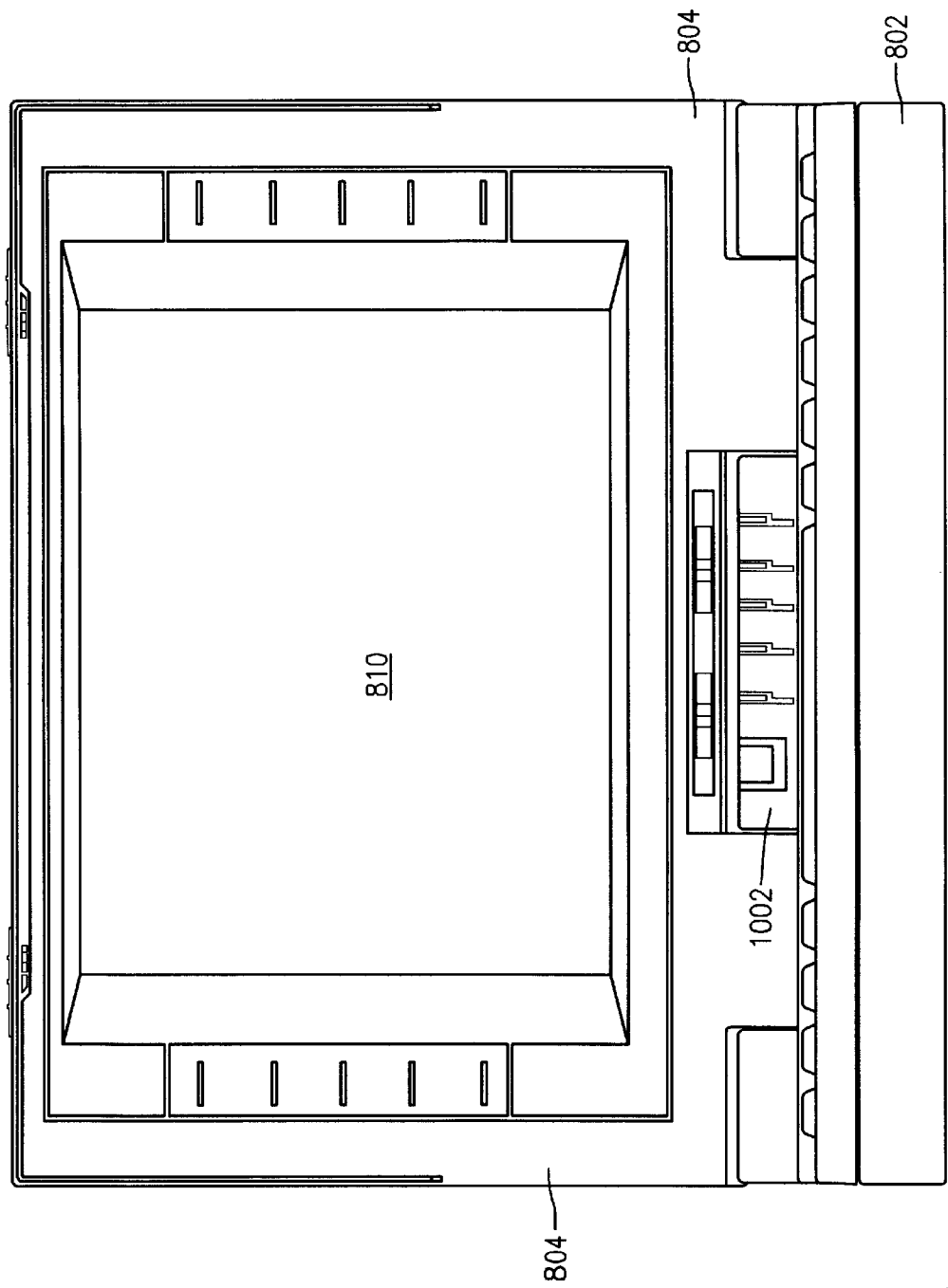

FIG. 8B shows a front view of the computer of FIG. 8A, with the cover open. Note that the dual-purpose standby/sleep button, described below, is visible.

Figure 8C:
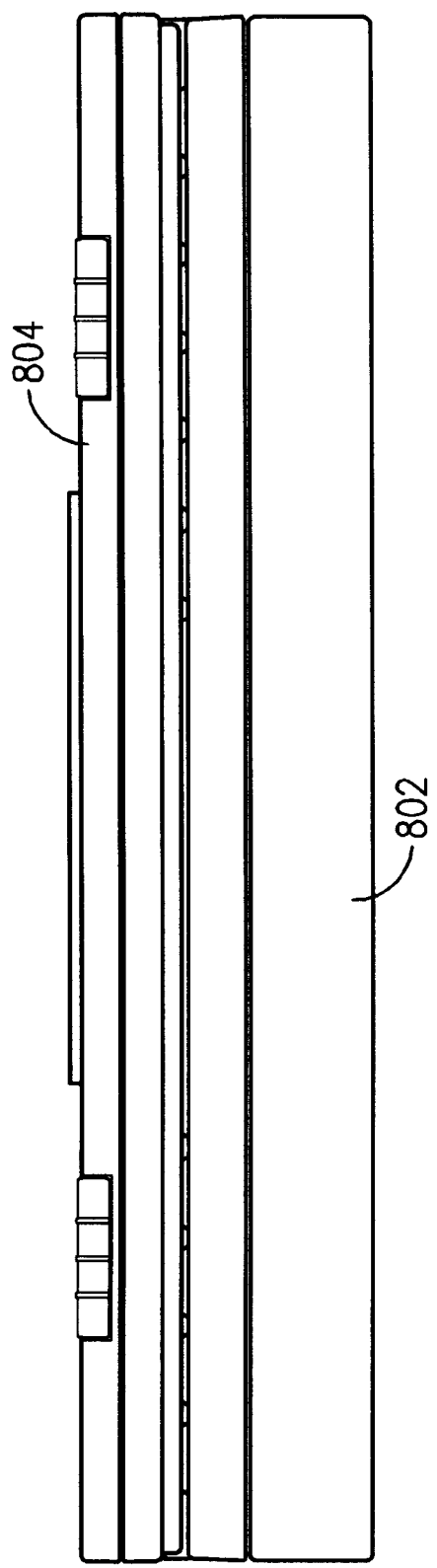

FIG. 8C shows a front view of the computer of FIG. 8A, with the cover closed.

Figure 8D:
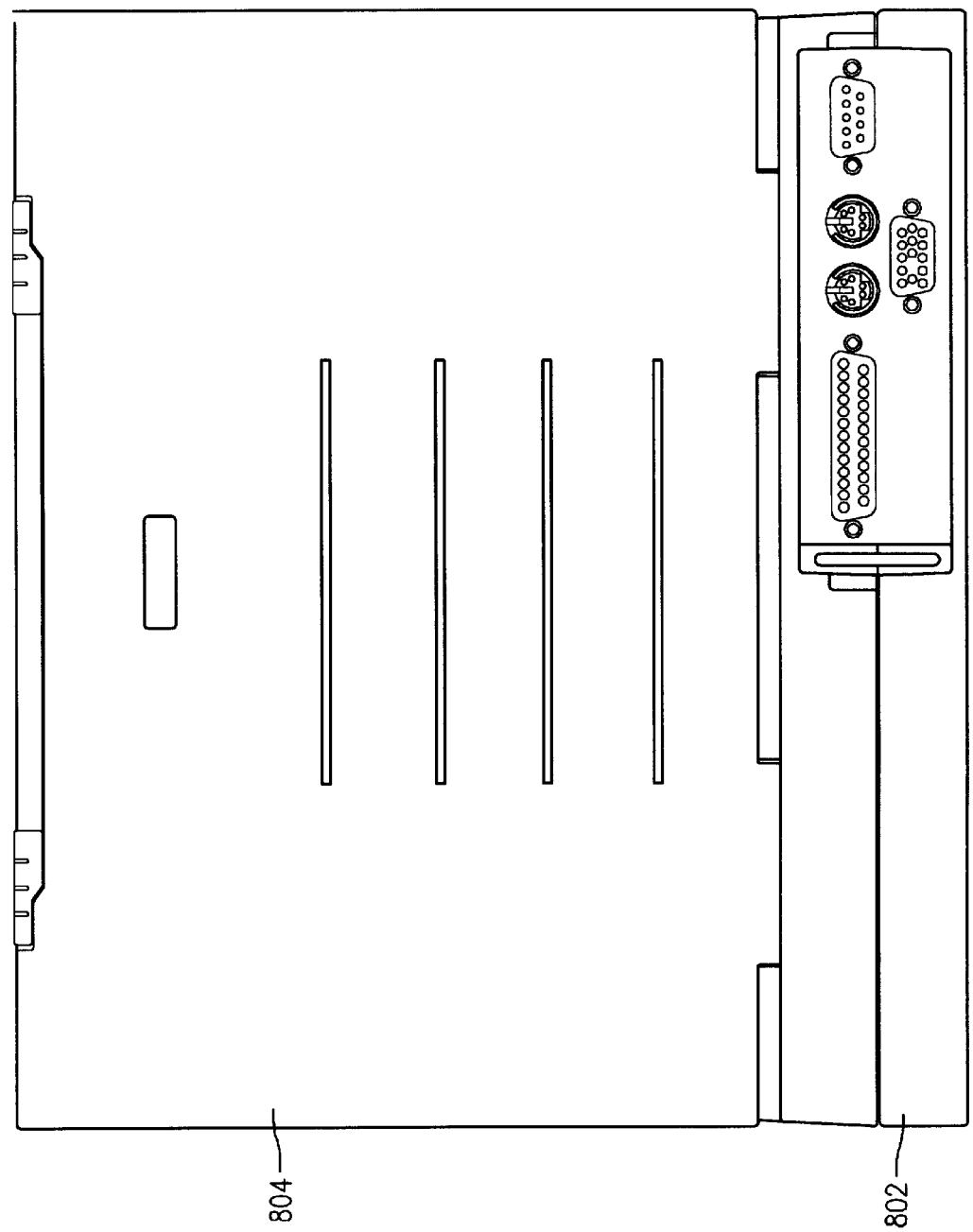

FIG. 8D shows a rear view of the computer of FIG. 8A, with the cover open. Note that keyboard, display, and serial port connectors are visible.

Figure 8E:
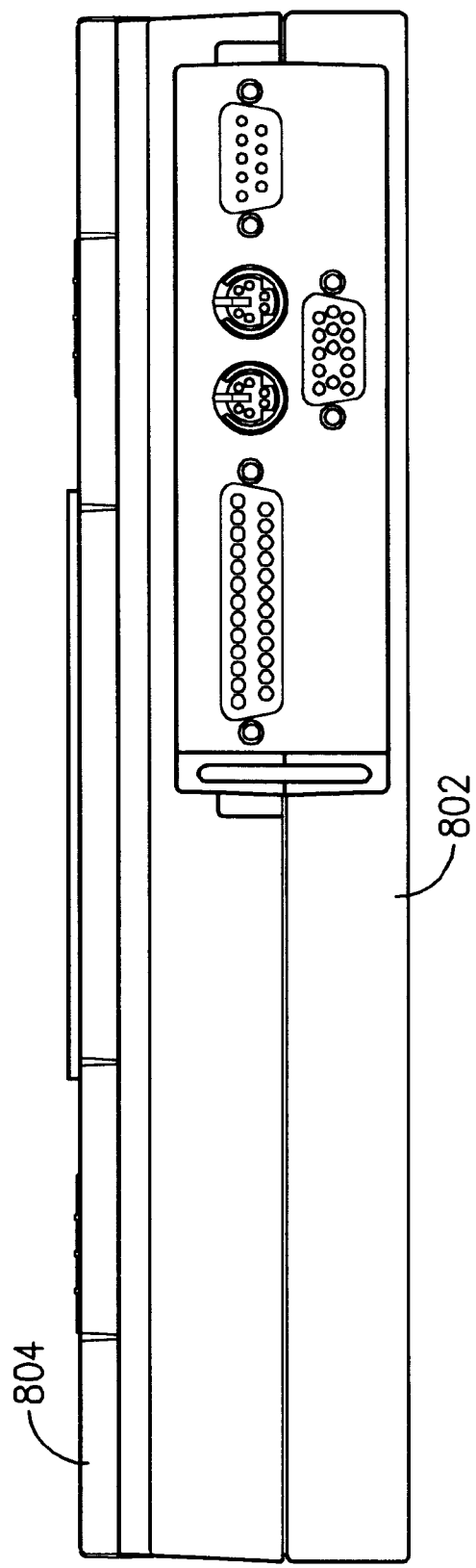

FIG. 8E shows a rear view of the computer of FIG. 8A, with the cover closed.

Figure 8F:
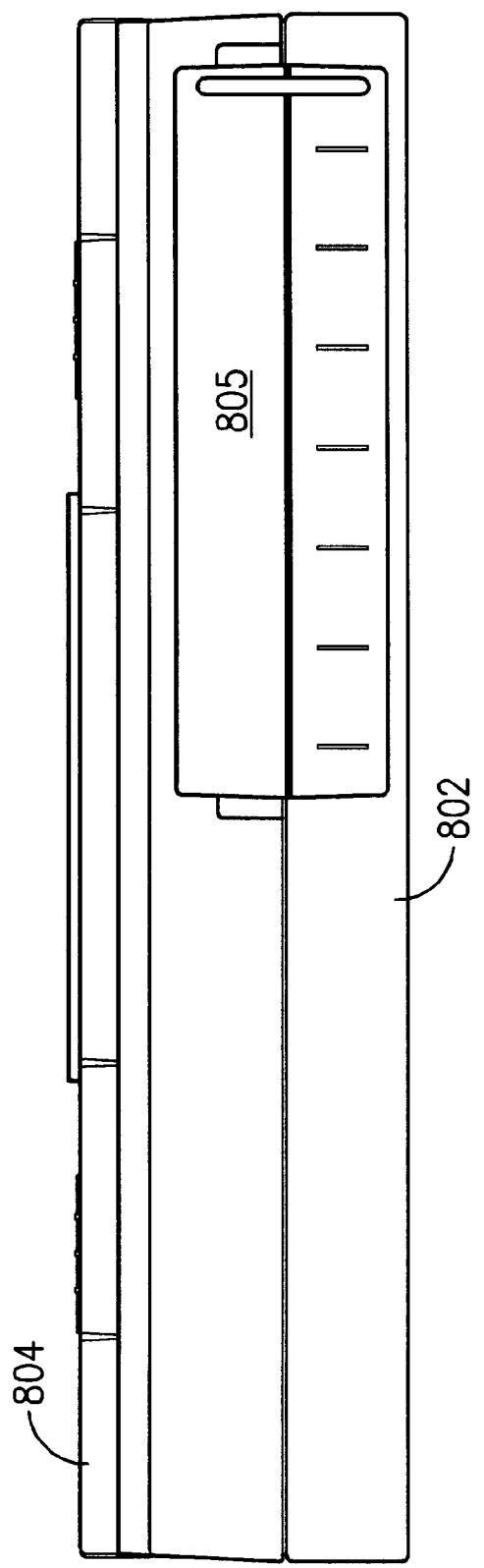

FIG. 8F shows a rear view of the computer of FIG. 8A, with the cover closed, and with a dust cover 805 emplaced to cover the external connectors visible in FIGS. 8D and 8E.

Figure 8G:
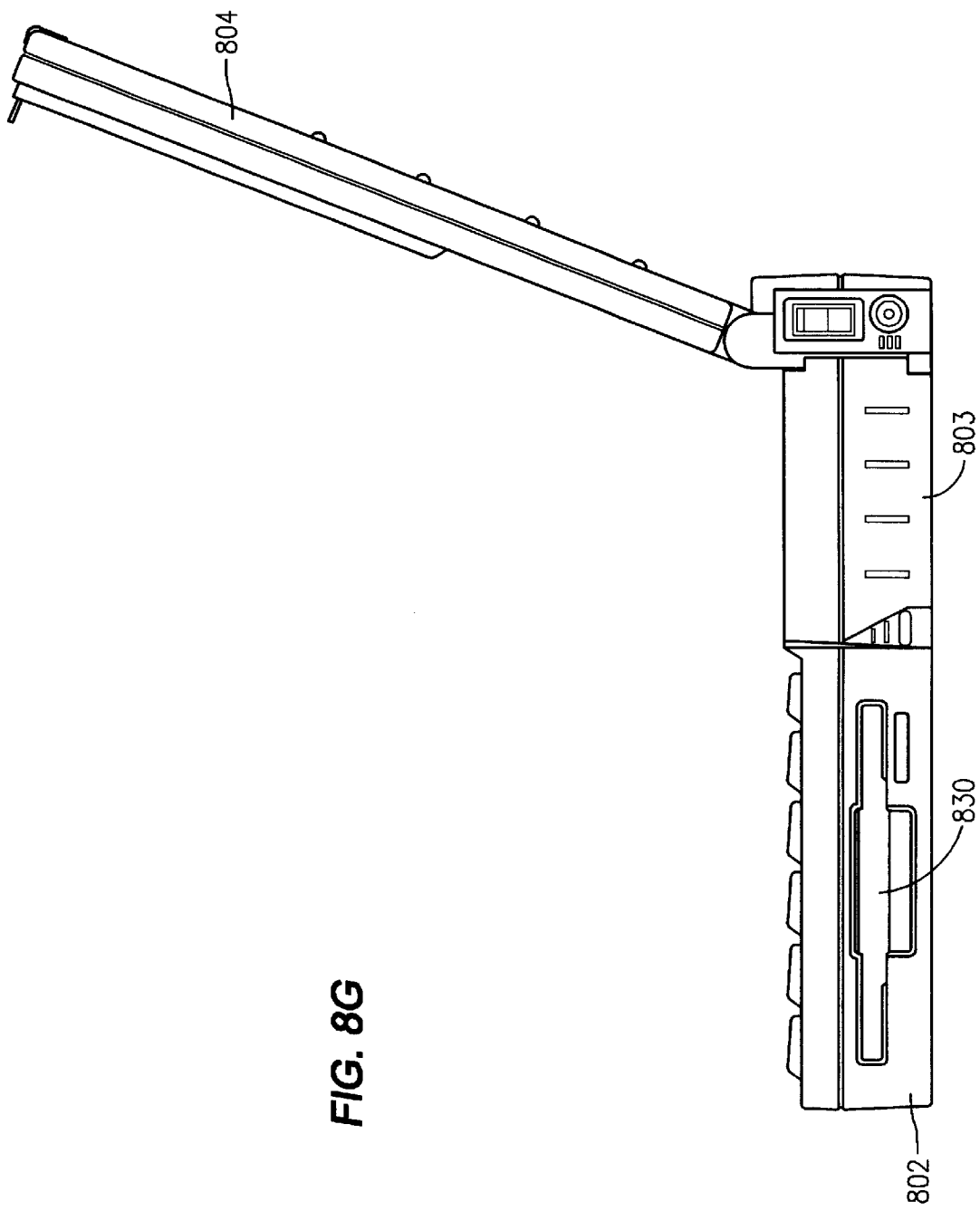
Figure 8H:
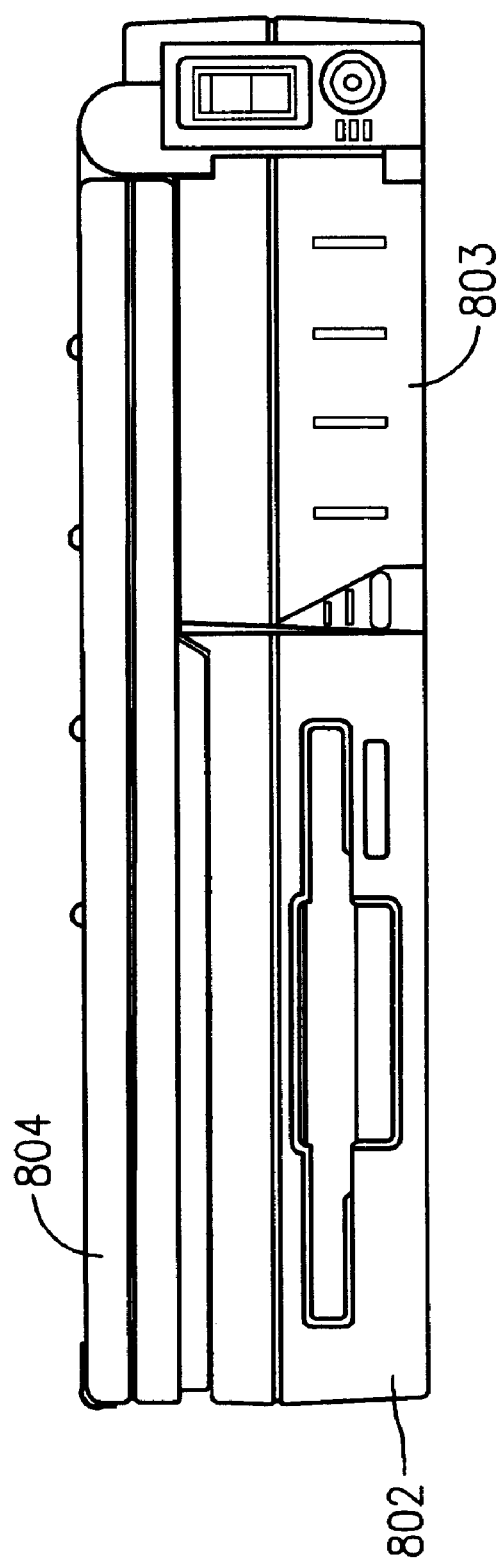
Figure 8I:
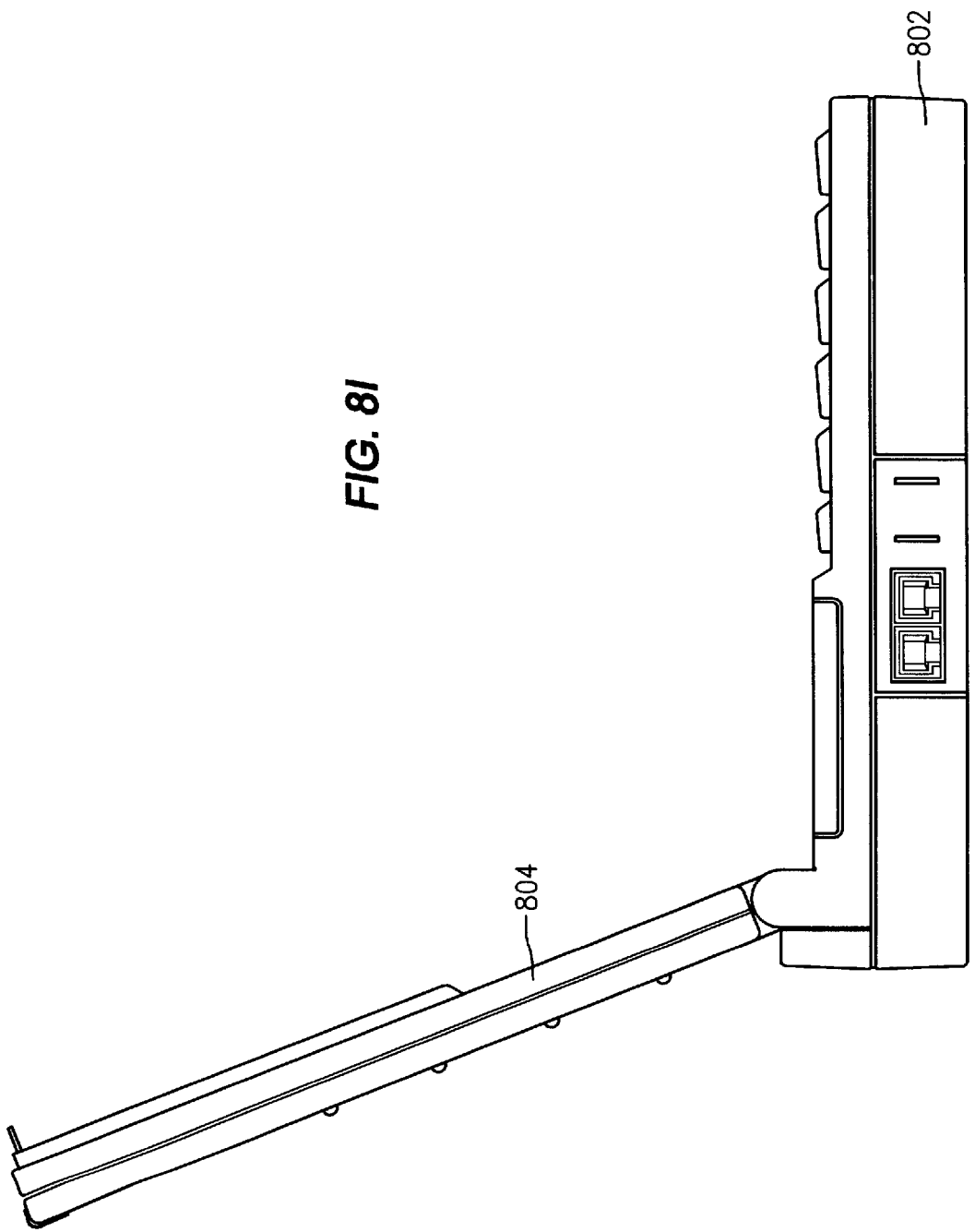
Figure 8J:
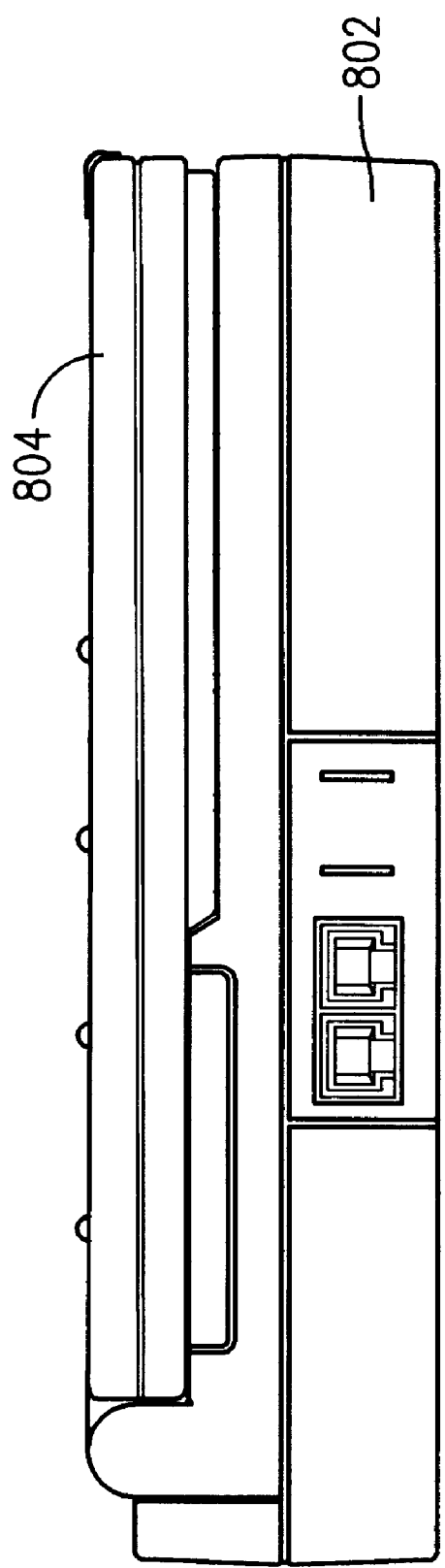

FIG. 8G shows the right side of the computer of FIG. 8A, with the cover open, and FIG. 8H shows the right side of the computer of FIG. 8A, with the cover closed. FIG. 8I shows the left side of the computer of FIG. 8A, with the cover open, and FIG. 8J shows the left side of the computer of FIG. 8A, with the cover closed.

Electrical Organization

Figure 1:
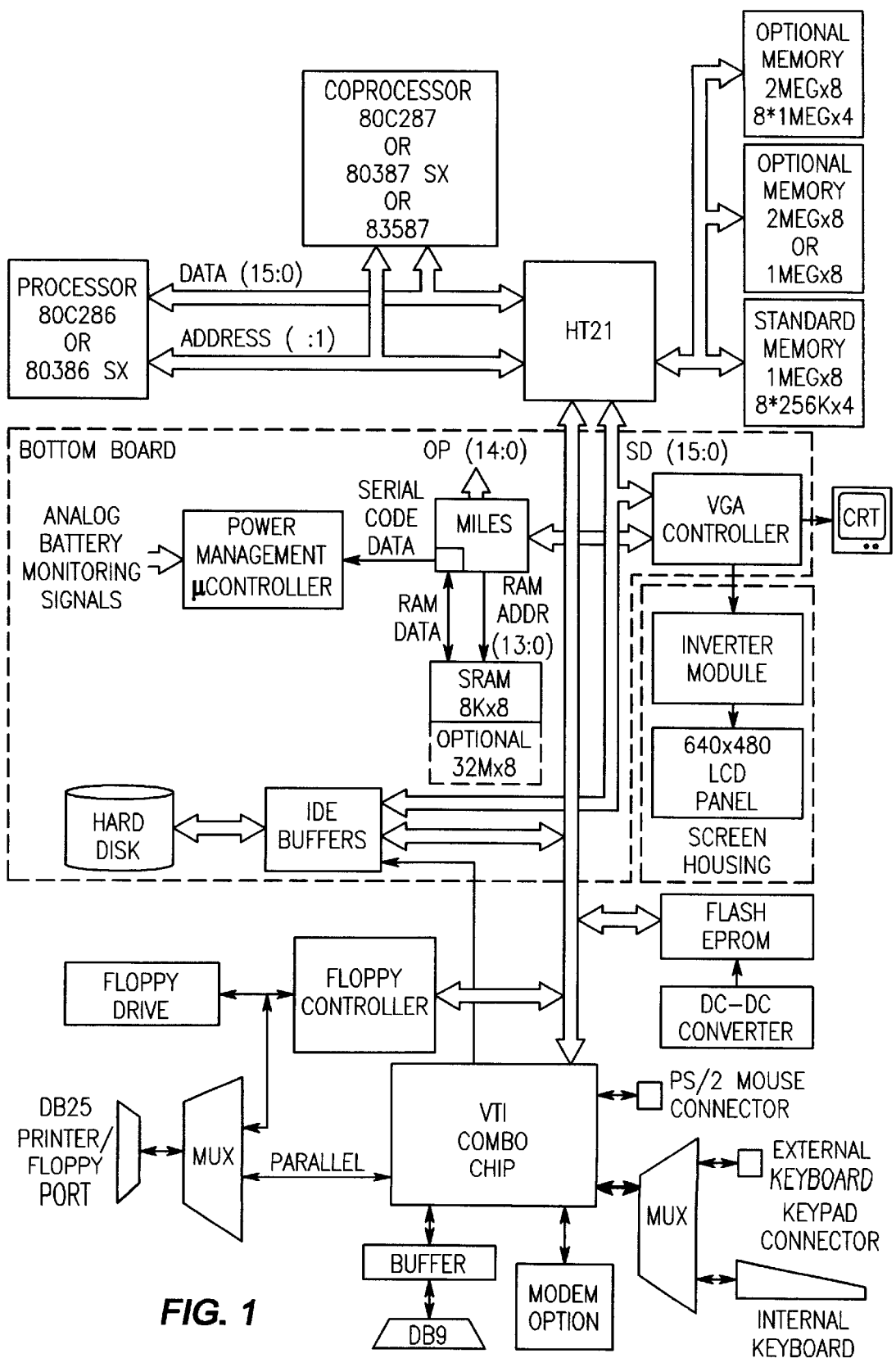
FIG. 1 shows the overall electrical organization of the portable laptop computer of the presently preferred embodiment.

FIG. 1 shows the overall electrical organization of the portable laptop computer of the presently preferred embodiment.

The presently preferred embodiment is actually planned for production in two versions, one using a CMOS version of the 80286 processor and one using a CMOS version of a 386SX processor. Of course, these two processors are extremely similar to each other, and the differences between them have little relevance to the power of management architecture features described. Disclosed innovations can be applied not only to other Intel 8086-derived processors, such as the 80386 and 80486, but can also be applied to other processor families which may, in the future, find use in low-power portable computer systems.

The presently preferred embodiment relates to systems used in the ISA architecture. (Such systems are also referred to as systems which use the "AT bus.") However, it is alternatively possible to adapt at least some of the disclosed teachings to other architectures, such as EISA bus systems or to other buses which may find use in the future.

In the presently preferred embodiment, an HT21 chip, from Headland Technologies, is used to provide a variety of peripheral support functions to the main microprocessor.

These include bus management, memory management, interrupt control, and DMA control. Serial port management and keyboard interface are provided by an 82C186 combination chip from VTI. Of course, other implementations of support logic and glue logic can be used if desired, within this well-known architecture.

The presently preferred system embodiment is a family of two highly similar notebook computers, varying primarily in the processors used. Both have an external closed size of about 8.5×11×2 inches. One version is based on an Intel 80C286 microprocessor running at 12.5 MHz, and the other version is based on an Intel 386SX processor running at 20 MHz. Both notebooks contain similar I/O devices, including, in the presently preferred embodiment:

a Sharp VGA flat panel display;

Conners Peripherals 222 or 242 20 or 40 MB 2.5" hard disk;

Epson 3.5" floppy disk drive;

WD 90C20 VGA controller chip;

VTI 82C106 I/O combo chip;

1 MB on board VSOP memory;

2 expansion memory slots; and

Power management microcontroller, with the Microcontroller Interface chip ("MILES") gate array assembly.

In addition, the following I/O connectors are available on the back panel for external devices:

25 pin D connector for parallel/floppy disk;

9 pin D connector for serial;

15 pin D connector for external CRT;

6 pin DIN connector for mouse; and 6 pin DIN connector for external keyboard.

Also available, through slide off panels, are an expansion connector for an optional modem, an 80387SX numeric coprocessor socket, and the 2 expansion memory connectors.

Figure 9:
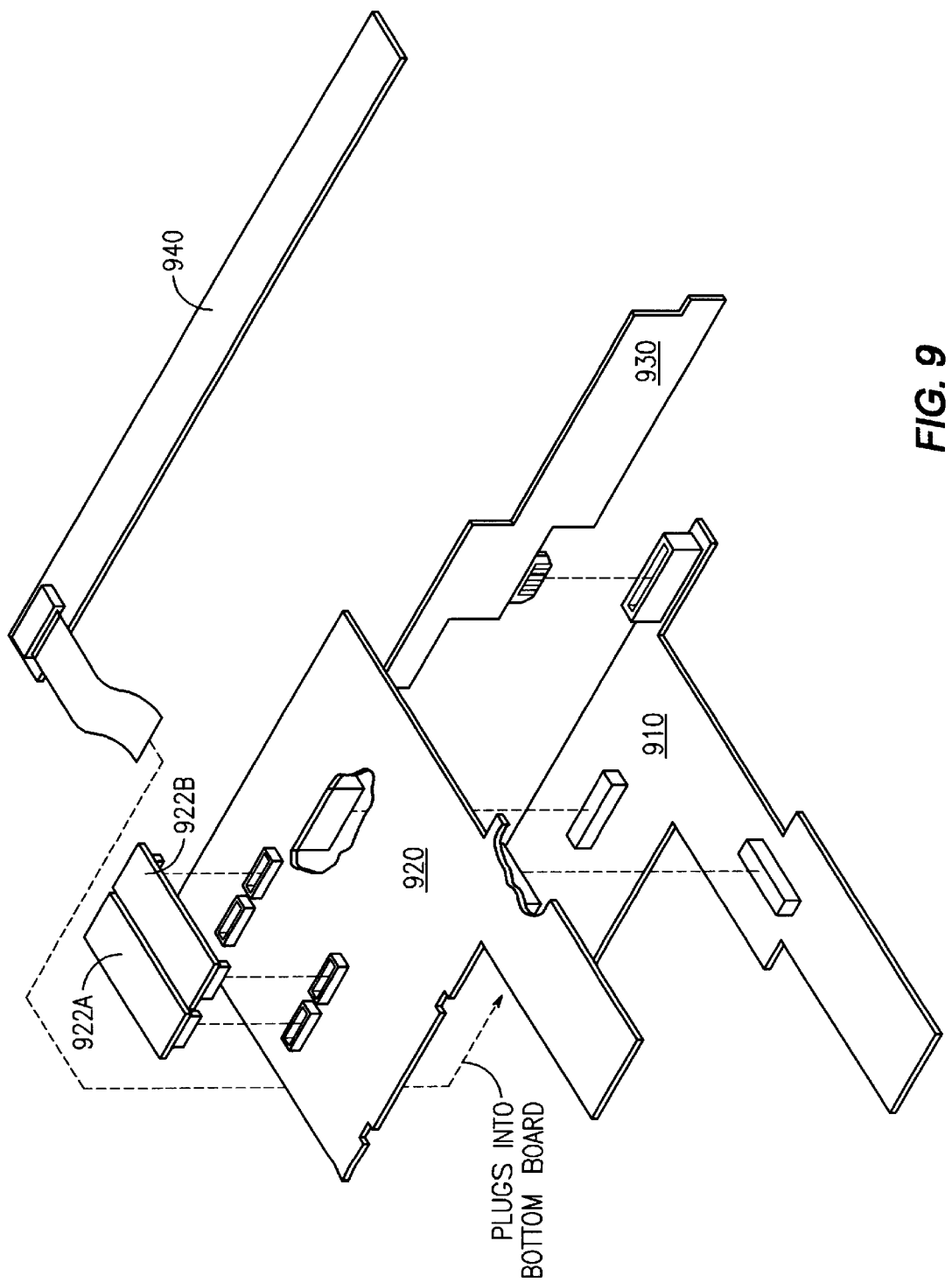
FIG. 9 shows generally how circuit boards are emplaced and connected in the portable laptop computer of the presently preferred embodiment.

FIG. 9 shows generally how circuit boards are emplaced and connected in the portable laptop computer of the presently preferred embodiment. Top board 920, and power module 930, are docked into Bottom board 910.

Figure 10:
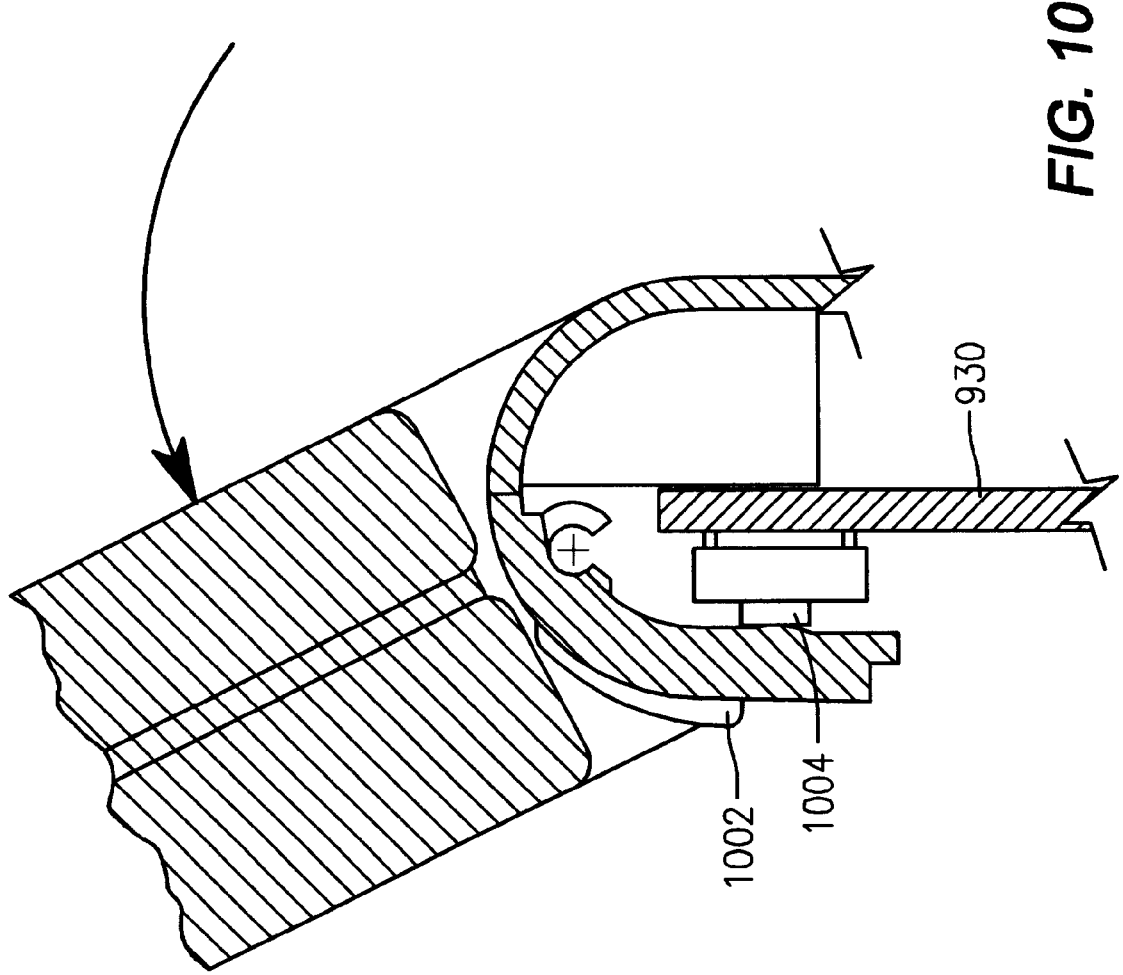
FIG. 10 is a detail view of the case-closing switch and button of the presently preferred embodiment.

FIG. 10 is a detail view of the case-closing switch and button of the presently preferred embodiment. (This is a cutaway view, looking from the right side of the case, showing the lid in the process of closing.) When the lid 904 is closed, it bears against movable lever 1002, which in turn bears against switch 1004. However, when the lid is open, button 1002 is easily accessible to the user's finger, as may be seen in FIG. 8A.

Thus, the cam-like action of lever 1002 provides reliable button depression when the case is closed. The switch 1004 is mounted, in the presently preferred embodiment, on the power module board 930.

Rechargeable Battery Module

Figure 7A:
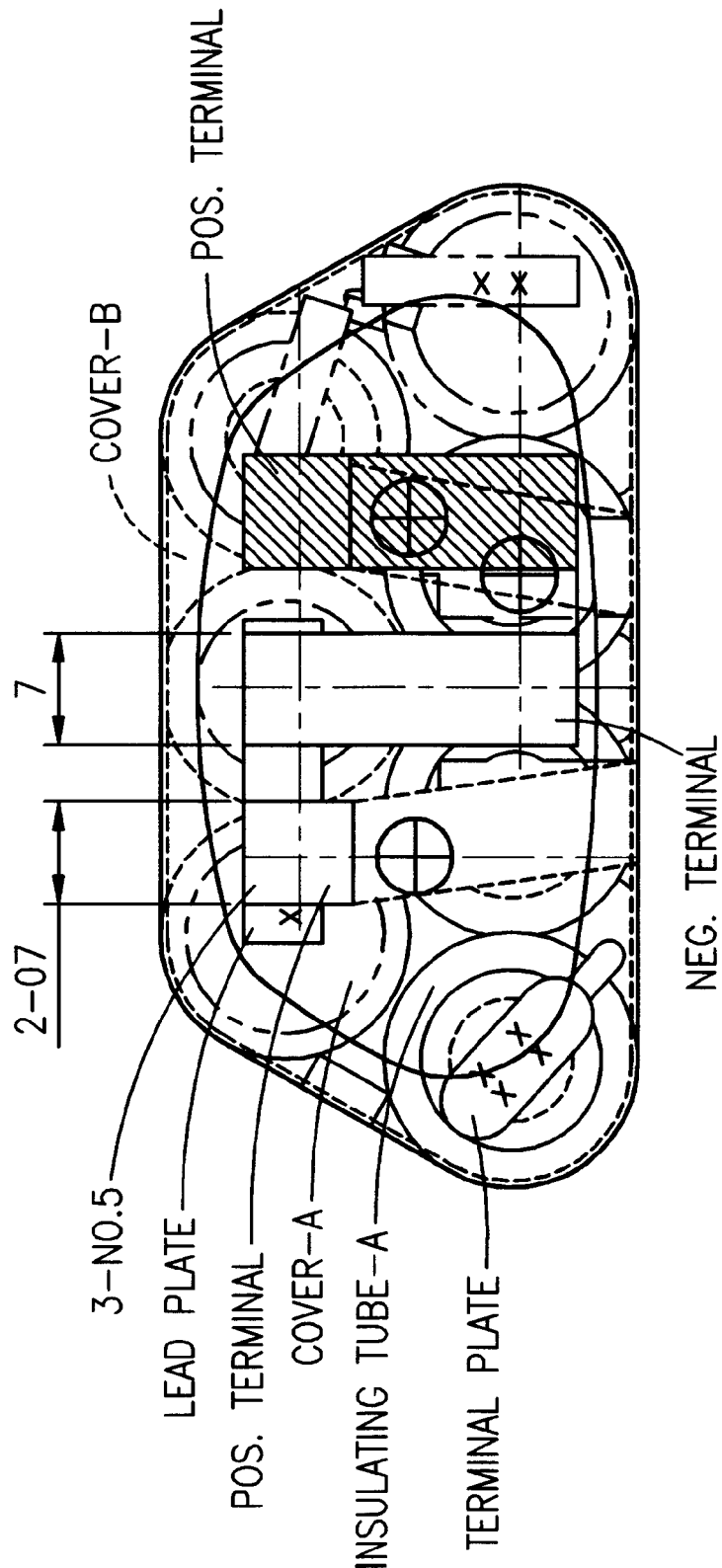
FIG. 7A shows the physical structure.
Figure 7B:
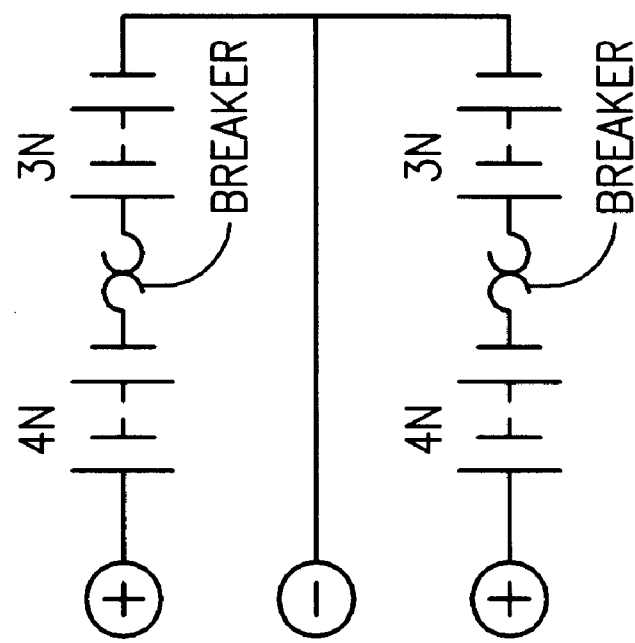
FIG. 7B shows the electrical connections, of the rechargeable battery module of the presently preferred embodiment, containing two electrically separate banks of 7 batteries each.

FIG. 7A shows the physical structure, and FIG. 7B shows the electrical connections, of the rechargeable battery module of the presently preferred embodiment, containing two electrically separate banks of 7 batteries each. Note that a fuse is included in the middle of each bank of batteries.

In the presently preferred embodiment, the battery module is configured as two banks of 7 Ni-Cd batteries in series. Thus, each bank provides a rated voltage of 8.4 Volts.

The battery sizes are selected, in the presently preferred embodiment, to provide a charge capacity of 1700 mA-hr for each bank; but of course the battery sizings could be changed if needed.

Connections for Power Supply and Management

Figure 2:
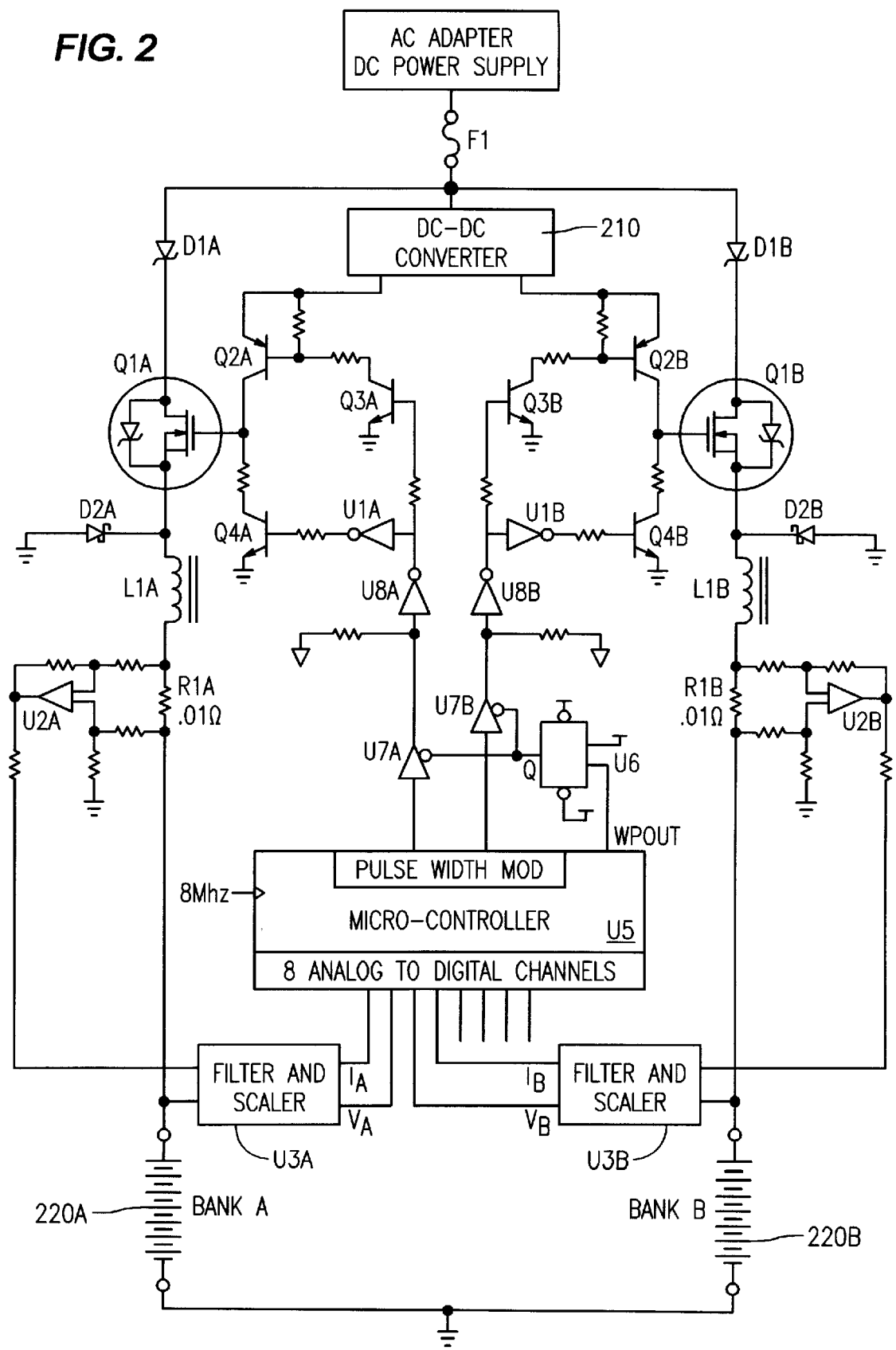
FIG. 2 shows the analog connections used, in the presently preferred embodiment, for monitoring the state of the two battery banks.
Figure 3:
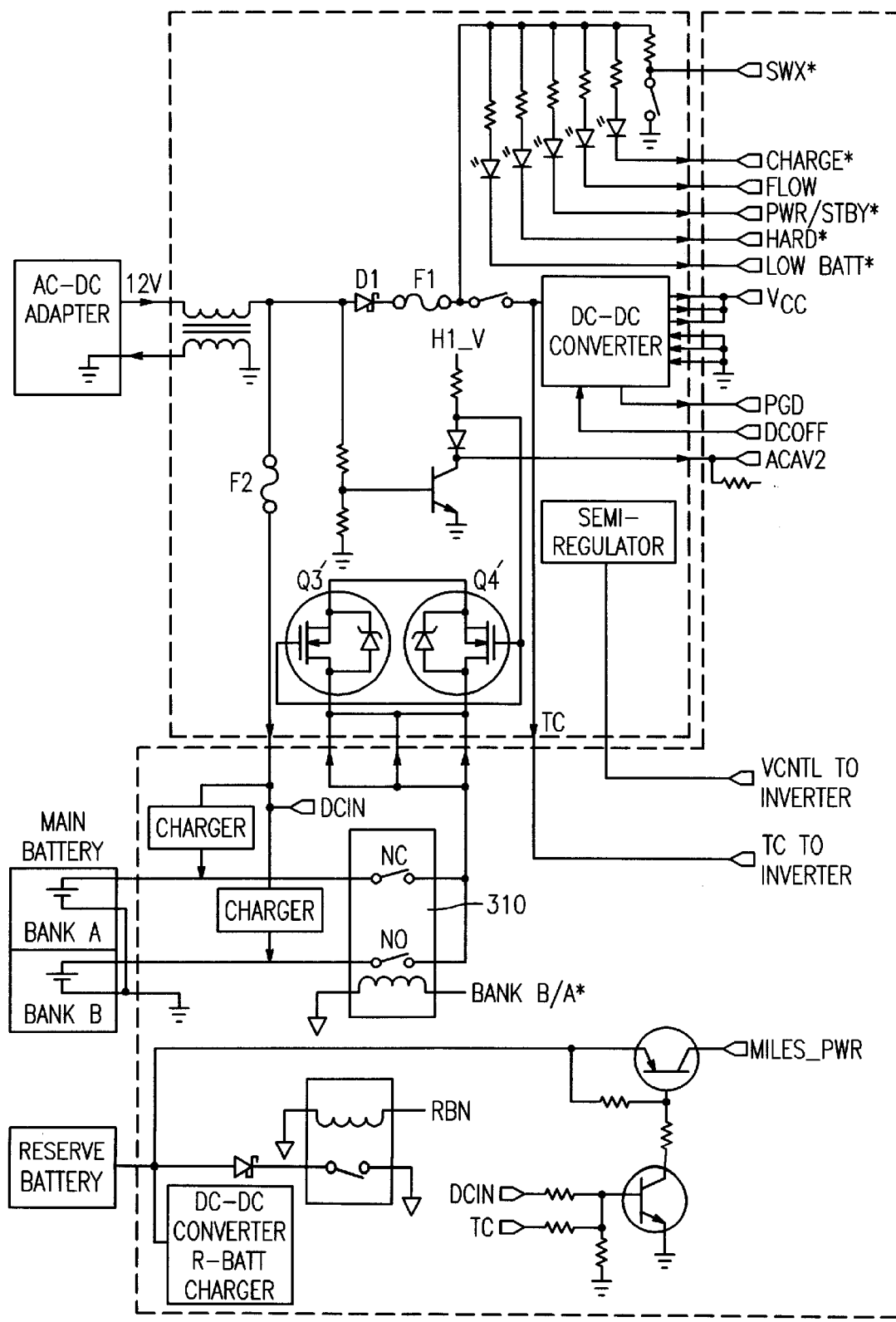
FIG. 3 shows more details of the power-supply and power-control circuitry actually used, in the presently preferred embodiment.

FIG. 2 shows the analog connections used, in the presently preferred embodiment, for monitoring the state of the two battery banks. FIG. 3 shows further details of the power-supply and power-control circuitry in the preferred embodiment.

The power system for any battery powered computer varies quite a bit from a standard desktop computer. The power system used in the presently preferred embodiment is unusual, even for battery powered systems. Power is available from several sources; the main battery, a reserve battery, and an AC to DC adapter which is external to the system. Power from the main battery and the AC to DC converter must be regulated to 5 volts through the DC to DC converter 210. This is located on the System Power Module 930, which is located along the back right hand wall of the case. The ON/OFF switch is also located on the SPM, and protrudes through the plastic case on the right side of the unit (as seen in FIG. 8A). Since the external AC to DC adapter and main battery are on a common node on the input to the DC to DC converter, the battery banks are protected from overcurrent from the AC adapter by diodes D1A and D1B. Diodes D1 can dissipate up to 900 mW at their 2 Amp nominal current draw. A significant dissipation results even when a low voltage drop Schottky Barrier diode is used. In the presently preferred embodiment, this power loss is reduced by shorting diodes D1 with a pair of FETs whenever there is no external power being supplied. (This circuit arrangement, with FET pair Q3' and Q4', may be seen in FIG. 3.)

The battery management circuitry, in the presently preferred embodiment, is centered around a National Semiconductor COP888CF microcontroller (shown as U5 in FIG. 2). This device has 8 analog inputs to an analog to digital converter, 2 timer outputs that can be set up as pulse generators, several digital I/O lines and internal program ROM. The microcontroller monitors both banks of batteries 220A and 220B for both the current through, and the voltage of, each string of 7 cells. (In the presently preferred embodiment, each battery bank includes seven KR-1700AE Ni-Cd cells, as shown in FIGS. 7A and 7B.) The microcontroller software applies a very short duty cycle pulse for a period of time to check that the battery is accepting the charge current properly, and is not shorted. Then, when the battery voltage reaches about 7 volts, the pulse width is increased until about 800 mA are being applied.

The microcontroller has a feature called the "Watchdog timer output". Through a fairly safe scheme, this output will generate a pulse on line WPOUT if the microcontroller is not executing its program properly. If this occurs, U6 latches the condition, which tristates U7A and U7B. A pullup on the output causes the gate of Q1A and Q2B to be pulled to ground, shutting the charger's current path off to the battery. This provides a safe condition during reset, and a safe condition in case the microcontroller should fail.

The charge current is regulated through a pulse width modulation scheme in which Q1A and Q1B are switched at a frequency of about 10 kHz. The width of the pulse determines how much average current is allowed to flow through the battery. L1A and L1B are toroidal core inductors that prevent excessive amounts of current to be sourced from the ac adapter. The two diodes D2A and D2B provide negative current to flow through L1A and L1B after Q1A and Q1B are turned off, and the field induced in L1 collapses. Transistors Q3A and Q2A are turned on to allow the gate of Q1A to be pulled to the 21 volt level of the dc to dc converter. Op amp U2A is used as a differential amplifier across R1A (0.01 ohms) to obtain a signal $I_A$ which measures the current from battery bank 220B. The output of U2A is filtered and scaled by U3A, and is read by the microcontroller U5 through one of its analog to digital converter inputs. The pulse width is adjusted by the microcontroller U5 to maintain a constant current of about 800 milliAmps. U3A is also used to filter and prescale the battery voltage measurements, to produce an analog signal $V_A$ to U5. Signals $V_B$ and $I_B$ are similarly generated to measure the voltage and current of the other main battery bank 220B.

Q3 is turned on by the microcontroller pulse through U7 and U8. Turning on Q3 pulls the base of Q2 low, which causes it to conduct, allowing 21 volts to be supplied to the gate of the power FET, Q1. U1 inverts the signal from the microcontroller, turning Q4 off whenever Q3 is on. When the signal rocontroller goes inactive (high), the base of Q4 is driven high, causing Q4 to conduct and drain the gate capacitor of Q1 through a small resistor (about 220 ohms) to ground. This allows for a fast turn off and turn on time for the FET (Q1). Keeping Q1 in its non-linear region keeps it from becoming heated, so that no heat sink is needed for these FETs.

FIG. 3 shows some additional details of the power management circuitry. This circuitry is shown primarily for very full compliance with the best mode requirements of the U.S. patent law. Note, however, the relay 310, which switches back and forth between the two battery banks 220A and 220B.

Power-Management Program

The following high-level pseudo-code shows the program structure which is a actually used, in the presently preferred embodiment, for power management.

POWER ON

Perform basic integrity check
    Check power switch
        If switch on go to NORMAL START
        If switch off go to NORMAL CHARGE MODE
NORMAL START Turn on POWER ON led
    Initialize port direction and interrupt registers
    Initialize timers
    Test for AC Available
    Begin Normal Operation MAIN Loop
MAIN - (Normal Operation)

Monitor - Battery Voltage Standby Switch AC
        Available System ON switch and blink
        Charge LED if on Activity Lines (Reset
        timeouts when active) If Dynamic
        adjustment enabled reset HD and floppy
        timeouts during keyboard activity.
TIMER INTERRUPT - 5.12 msec.

Service Watch Dog Timer Register
    Store current battery voltage
    Compare with past for rapid drop detection
    Compare with minimum absolute level
    Compare with warning level
        Test alternate battery before activating alarm
            and switch batteries if indicated
    Decrement Seconds Timer
        Each Second:
            Decrement timeout counters
                Battery Change
                Hard Disk
                System Sleep
                Backlight Timeout -continued If Beeper active
        Decrement pause counter and call BEEP
        Test and debounce standby switch
BATTERY DETECT INTERRUPT Switch to reserve battery
    Start 2 minute timeout for system power off
    Turn off LCD to reduce power consumption
    If Floppy and HD not active, put system in standby
        mode
    Accumulate reserve battery use time (After 1 minute
        of reserve on time, of operation, the
        reserve charger will be enabled during the
        next battery charge cycle. After 2
        minutes of use the reserve battery will be
        charged from the main battery if no AC is
        available.)
    Monitor BDT* line for new battery installed to
        terminate function
    Test new battery and switch reserve off if voltage
        good
BATTERY CHANGE Read current battery voltage
    Read target battery voltage
    Switch if alternate is same or higher
LOW-POWER-1 mode BEEP for 5 seconds (2 times every second) (COP
        should enable speaker on low volume if
        user has it off)
    Turn on LOW BATTERY LED
    Set Low Power 1 Flag
LOW-POWER-2 mode BEEP for 5 seconds (2 times every second) (COP
        should enable speaker on high volume
        regardless of the user setting)
    Flash LOW BATTERY LED
    Turn off LCD back light
    Set CPU clock to slow speed
    Set Low Power 2 flag
    Enable keyboard interrupt and turn LCD backlight on
        with any key
    Scan for presence of external power or new battery
LOW-POWER-3 mode Place main CPU in standby mode if not already there
    Output continuous beep for 3 seconds
    Save voltage reading for future comparison
    Turn off the power module
POWER ON ALARM (Standby Switch held low for 5 sec or more)

Exit immediately if external video active
    LCD back light is turned off.
    CPU clock speed goes to slow speed.
    Flash Power On LED indicating Standby mode
    A beep alarm is sounded if operating on batteries.
        (2 beeps every 4 minutes)
    Monitor the standby switch to determine when the LCD
        panel is opened to exit this mode.
    Exit standby immediately when the cover is opened.
STAND-BY/RESUME KEY Enter and exit standby when button lifted
    CPU clock set to slow speed
    LCD back light is turned off
    CPU is placed in HOLD mode for minimum power
        consumption
    POWER LED is flashing (.5 sec on 2 sec off)
    COP pulses the HT21 refresh line to refresh memory
        Monitor the STAND-BY/RESUME key to exit
        stand-by mode
    Exit hold for a fixed period on each timer interrupt
        to allow system time to be maintained.
    Mask keyboard and mouse interrupts and have COP
        clear the keyboard controller buffer and
        restore the interrupt controller mask
        register before exiting standby.

-continued

SLEEP MODE

Reduce clock speed to slow
    Turn off LCD backlight
    Enable keyboard interrupt
    Monitor system activity (keyboard, ports, and
            restore full speed if any activity
            detected
    If inactive for more than 1 minute and AC is
            available, begin Sleep Charge Mode
    Allow Standby Key press to exit sleep mode
NORMAL CHARGE MODE Turn on CHARGE led
    If Reserve Charge Flag set, start reserve charge
            with 2.5 hour fail safe timeout
    Minimum duty cycle for 3 minutes
    Monitor voltage rise and current
    If max voltage and no current then battery open
    If current rise with no voltage then sr rted
    If OK gradually increase current to target value of
            750 ma. Start fail safe timeout of 4
            hours
    Monitor voltage until it starts to decline or holds
            constant for xx minutes
    If voltage reaches the power supply maximum then
            monitor the charge current watching for an
            increase or a constant value for xx
            minutes to indicate end of charge
    When end conditions are reached shut off charging
            current Flash CHARGE led at a low duty
            cycle when charged
    Wait .5 hour with charge off before resuming trickle
            charge on batteries to allow them to cool
            off from charge
SLEEP CHARGE MODE Turn on CHARGE led
    Miniinum duty cycle for 3 minutes
    Monitor voltage rise and current
    If max voltage and no current then battery open
    If current rise with no voltage then shorted
    If OK gradually increase current to target value of
            xxx ma. Start fail safe timeout of xx
            hours
    Monitor voltage until it starts to decline or holds
            constant for xx minutes
    If voltage reaches the power supply maximum then
            monitor the charge current watching for an
            increase or a constant value for xx
            minutes to indicate end of charge
    Exit charge mode and start blink of CHARGE led
            before system exits sleep mode
    Flash CHARGE led at a low duty cycle when charged
    When end conditions are reached shut off charging
            current
HOST BIOS FUNCTIONS

POST

Reset COP
    Checksum MILES SRAM and compare version number
    If necessary reload COP program
    Start COP
    Transfer setup parameters to SRAM and clear
            CDONE to interrupt COP
        Check for proper operation of COP
        Set processor to compatibility speed (per
            SETUP)
        Turn on LCD backlight
    SWITCH DISPLAYS Send Display_Type command to COP (LCD/CRT)
    WAIT FOR KEY (INT 16H function 0)

If no character is available issue a CPU-HOLD
            command to the COP
    SETUP COP returns status of standby button, etc. to -continued setup
        Transfer interrupt mask to be used in standby
            to COP
        Transfer parameters to COP before exiting setup
    CTL/ALT/DEL (soft boot)

Place COP in reset before resetting CPU
    EXTERNAL PROGRAM INTERFACE

Verify power status before programming Flash
            Eproms
        Enable reserve battery for Flash programming
            power backup A computer program listing, in the application's file of this patent, shows a detailed implementation of the COP code to perform these functions, in the presently preferred embodiment. However, the foregoing listing shows the key relations of the preferred program structure.

CPU and Bus Management

The presently preferred embodiment provides two versions, differing primarily in the choice of CPU: one version with an Intel 80C286, and one version with an Intel 386SX.

The presently preferred embodiment relates to systems used in the ISA architecture. (Such systems are also referred to as systems which use the "AT bus.") However, it is alternatively possible to adapt at least some of the disclosed teachings to other architectures, such as EISA bus systems or to other buses which may find use in the future.

In the presently preferred embodiment, an HT21 chip, from Headland Technologies, is used to provide a variety of peripheral support functions to the main microprocessor. These include bus management, memory management, interrupt control, and DMA control. Additional information regarding this chip may be found in its data sheet, which is available from Headland Technologies, and which is hereby incorporated by reference.

Serial port management and keyboard interface are provided by an 82C186 combination chip from VTI. Of course, other implementations of support logic and glue logic can be used if desired, within this well-known architecture.

In the presently preferred system embodiment, the BIOS is carried in flash EPROM. Thus, BIOS update requires erasing the flash EPROM. If power were lost while this operation were in progress, the machine would become nonfunctional. Therefore, in the presently preferred embodiment, the on/off switch is disregarded while flash EPROM programmation is in progress.

Power-Management Microcontroller

A COP888CF microcontroller is used to perform the power-management functions, in the presently preferred embodiment. This microcontroller has an unusual feature: A/D converter circuitry is included on-chip, so that the chip can directly receive 8 channels of analog input. However, alternatively, other microcontrollers could be used, with off-chip converters or analog interface chips if desired.

The Microcontroller Interface Chip ("MILES")

Figure 4:
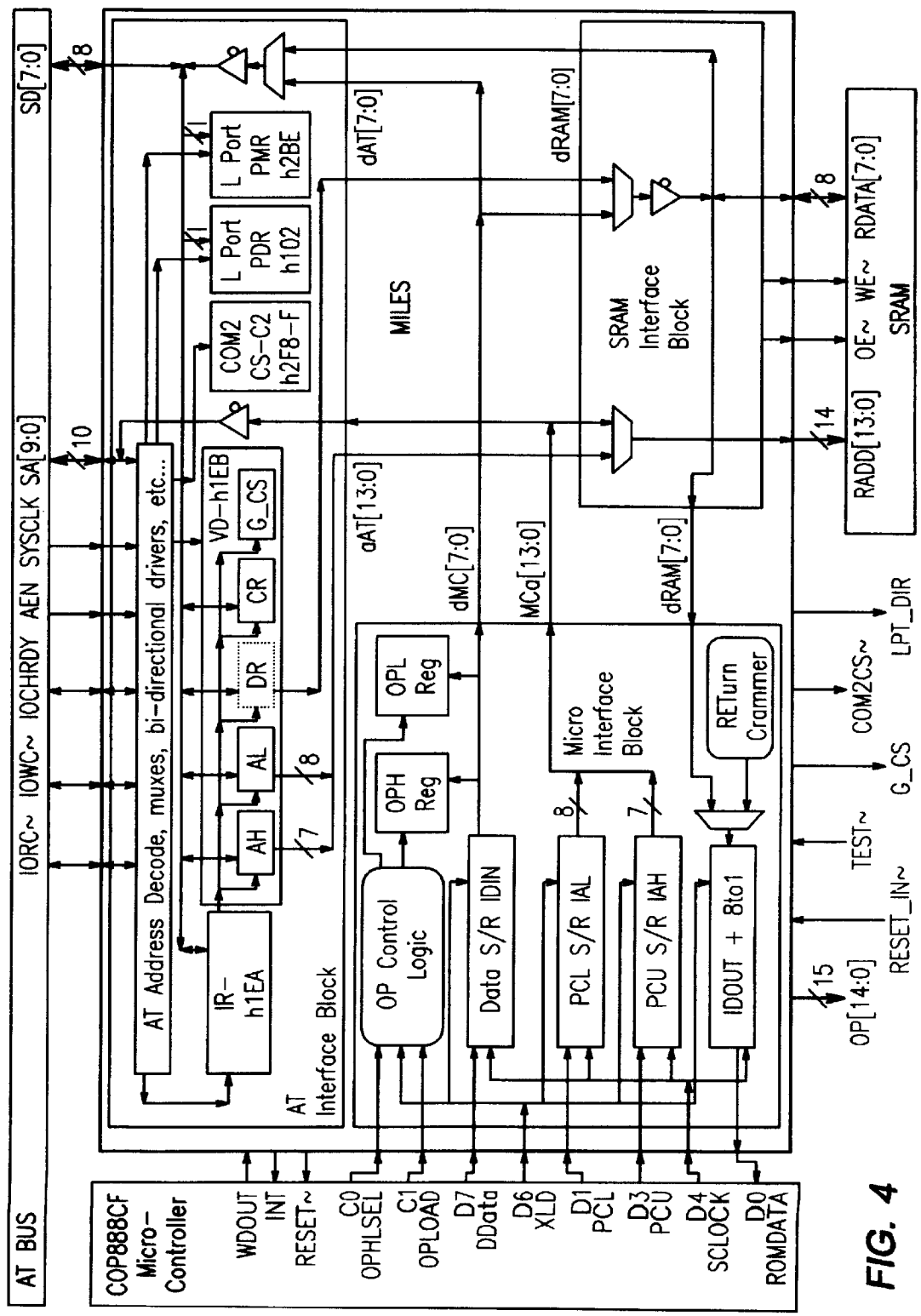
FIG. 4 is a block diagram of the microcontroller interface chip, in the presently preferred embodiment.

FIG. 4 is a block diagram of the microcontroller interface chip, in the presently preferred embodiment. This figure shows significant signals which interface to the other chips, and also shows some important on-chip registers. The significance of these signals and registers will now be described.

The microcontroller interface chip (which is often referred to herein as "MILES") is an interface chip between the National Semiconductor COP888CF microcontroller, its SRAM for program memory, and the AT bus.

The Microcontroller Interface Chip allows the BIOS to download programs to the SRAM, and the COP888CF can thus execute in ROMless mode by fetching code from the SRAM. This is accomplished via a serial communication channel between the Microcontroller Interface Chip and the microcontroller.

The Microcontroller Interface Chip also allows the COP888CF to read and write to the AT bus, so that it can control the system clock speed register in the HT21 chip, etc. The AT bus also has the capability to perform I/O reads or writes to the SRAM while the COP888CF is executing code.

The COP888CF performs power management functions such as monitoring the battery level, turning off the display when not in use, and powering down the machine after programmable periods of inactivity.

The main function of the Microcontroller Interface Chip is to interface between COP888CF microcontroller, an external SRAM, and the AT bus (which is driven by the HT21 chip by Headland Technologies).

Functional Block Definitions

MILES AT Bus Interface Block

This interface (schematically shown in FIG. 4) controls the AT address, data, and control signals (IORC~,[2] IOWC~, AEN, IOCHRDY) when executing AT I/O cycles to the Microcontroller Interface Chip. This interface handles both slave and master cycles on the AT bus by providing an intelligent state machine. This state machine keeps track of AT cycles as well as tristating the address/data busses and control signals. Address bits are be latched, and data bits are not latched, on slave cycles (i.e., when an AT master is writing to the SRAM). Data is read from or written directly to the SRAM.

[2] In the present document, a tilde ~ following a signal name is used conventionally to indicate an inverted or active-low signal.

MILES COP888CF Microcontroller Block

This interface (schematically shown in FIG. 4) includes a serial/parallel shift register for both the address and the data paths. The SRAM address is supplied from the AH and AL registers. The COP888CF always provides the address and data serially, and expects to receive the data requested serially on the next cycle. As will be described later, COP888CF reads from certain addresses are treated as Exception Cycles by the Microcontroller Interface Chip.

The microcontroller address is first shifted into the Microcontroller Interface Chip serially via the COP888CF D port pins D1 and D3 and then, depending on the cycle type, is passed to the SRAM or the AT bus. The COP888CF read data is then latched in the Microcontroller Interface Chip and shifted serially into the D0 pin of the microcontroller while the D port write data is shifted into the Microcontroller Interface Chip from the D7 pin and redirected to the SRAM, or the AT bus.

This block also includes two 8-bit control registers which can be loaded from the output data from the D7 pin of the microcontroller. Fifteen of these status bits are output directly to MILES output pins to control various external devices. The remaining bit selects either 1) AT I/O cycles or 2) SRAM or Register cycles for the COP888CF Exception Cycles. (See Sect 1.3.4.)

MILES External SRAM Block

This interface (schematically shown in FIG. 4) generates the SRAM control signals (OE~, WE~, CE~) as well as tristating the data bus during SRAM read cycles. Internal handshake signals, between the SRAM, the microcontroller and the AT bus, are mainly decode signals to distinguish between cycle types. The SRAM interface is compatible with 8K×8 memory as well as 32K×8.

MILES State Machines

The Microcontroller Interface Chip Gate Array includes two state machines: 1) a Slave state machine, and 2) a Master (Exception Cycle) state machine.

The Slave state machine tracks any AT bus cycles to the SRAM and generates the AT system data (SD) tristate enables. It also monitors the AT signals SA, IOWC~, IORC~, and AEN to distinguish between read and write cycles. It also generates IOCHRDY to insert wait states on the Microcontroller Interface Chip Slave I/O cycles to SRAM until the COP888CF is finished accessing the SRAM. This prevents conflicts between microcontroller accesses and AT accesses to the SRAM.

The second state machine, the Master state machine, controls all Exception Cycles. This includes microcontroller writes to the SRAM, the Microcontroller Interface Chip Master I/O cycles to the AT Bus, and the Set CDONE Bit cycles. This state machine drives the necessary AT control signals and busses required for the Master I/O cycles (SD, SA, AEN, IOWC~, and IORC~).

MILES Miscellaneous Block

This block includes latches for AT control signals (IOWC~, IORC~, IOCHRDY). It also includes logic to generate the state machine reset signal when the microcontroller is HALTed since the COP888CF Shift Clock does not clock during HALT. It also includes the slave state machine time out signal generated from a 3-bit counter.

MILES Register Definitions

AT Bus Interface Registers

These four registers and one chip select are the only the Microcontroller Interface Chip registers that appear in the AT address space. The address in the table heading is the AT address.

Index Register (IR): AT Address: h1EA

| X X X X X Index Value |

The Index Register (IR) is an 8-bit index into the Internal Interface Registers (IIR) of the Microcontroller Interface Chip. When the AT bus master reads or writes to the Virtual Data Register (VD), it accesses the (IIR) indicated by the contents of the (IR). Only bits 2-0 are implemented. All other bits will be read as zeroes. Writing to bits 7-3 has no effect. On RESET_IN~ low, this register is set to zero.

Virtual Data Register (VD): AT Address: h1EB

| Virtual Data |

The Virtual Data Register (VD) is an 8-bit port into the (IIR) of the Microcontroller Interface Chip. When the AT bus master accesses the (VD), it actually accesses the (IIR) indicated by the current value of the (IR).

Parallel Port Direction Register (PPD): AT Address: h3BE,SD5

```
X X   PPD   X X X X
```

The Parallel Port Direction Register (PPD) is a single-bit register used in conjunction with the Parallel Port Mode Register (PPM) to control the direction of the Parallel Port. When the (PPM) is set for Extended Mode Operation, this register controls the LPT_DIR pin out of the Microcontroller Interface Chip. When the (PPM) is set for Compatibility Mode Operation, then the LPT_DIR pin is always forced high (i.e., the Port is always an output) and the (PPD) has no effect on the port. Only bit 5 is implemented. Writing to any other bits will have no effect. This register cannot be read from the Microcontroller Interface Chip. When this address is read, the Microcontroller Interface Chip will not drive the SD bus; another device may drive the data (but not necessarily). On RESET_IN~ low, this register is set to zero.

Parallel Port Mode Register (PPM): AT Address: h102,SD7

```
EMODE~ X X X X X X X
```

The Parallel Port Mode Register (PPM) is a single-bit register used to set the Mode of Operation of the Parallel Port. When bit 7, SD[7], is written low, the port is set to Extended Mode operation. When bit 7 is written high, the port is set to compatibility mode operation, with the port configured as an output. Writing to any other bits will have no effect. In the presently preferred embodiment, only bit 7 is implemented. This register cannot be read from the Microcontroller Interface Chip. When this address is read, the Microcontroller Interface Chip will not drive the SD bus, another device may drive the data (but not necessarily). On RESET_IN~ low, this register (bit 7 only) is set to one.

```
EMODE~ = 1  ---->  LPT_DIR = HIGH
EMODE~ = 0  ---->  LPT_DIR = PPD~
```

COM2CS~ (C2) Modem Chip Select: AT Address: h2F8-h2FF

The COM2CS~ (C2) is a direct decode of the above AT addresses. Whenever there is an I/O read or write in this address range, the COM2CS~ pin on the Microcontroller Interface Chip will be driven low. All other times it is inactive high. the Microcontroller Interface Chip does not drive onto the SD bus during these accesses. Reset has no effect.

MILES Internal Interface Registers (IIR)

These four registers are used to generate and control AT read and write accesses to the SRAM. They are accessed indirectly from the AT bus by writing the address f the desired register into the (IR) and performing a read or write cycle to the (VD) Register.

Address High Register (AH): AT Address: h1EB

```
X A14 A13 A12 A11 A10 A9 A8
```

The Address High Register (AH) contains the 7 high order address bits of the 14-bit address to be applied to the SRAM. During AT I/O reads or writes to the SRAM, the contents of this register are input to address pins A8–A13 of the SRAM. A14 is output on pin OP14 if it is enabled by the A14EN bit in the Control Register. The AH register does not increment after access to the Data register. The unused bit (7) is not implemented and will be read as a 0. Writing to the unused bit has no effect. The AH Register is undefined after RESET_IN~ goes low.

Address Low Register (AL): AT Address: h1EB

```
A7 A6 A5 A4 A3 A2 A1 A0
```

The Address Low Register (AL) contains the 8 low-order address bits of the 13-bit address to be applied to the SRAM. During AT I/O reads or writes to the SRAM, the contents of this register are input to address pins A0–A7 of the SRAM. During SRAM accesses, the AL register auto increments as an 8-bit counter. The register is incremented at the completion of an access to the Data Register. The AL Register is undefined after RESET_IN~ goes low.

Data Register (DR): AT Address: h1EB

```
D7 D6 D5 D4 D3 D2 D1 D0
```

The Data Register (DR) is the data port to the SRAM for AT Master and Slave I/O cycles. Since the AL register auto-increments, sequential reads can be accomplished by multiple reads from the DR. Likewise, sequential writes to SRAM can be accomplished by multiple writes to the DR. The DR does not actually latch data; it is a data port between the Microcontroller Interface Chip and the AT.

Control Register (CR): AT Address: h1EB

```
X X X X   A14EN WDOUT~ RST~ CDONE
```

The Control Register (CR) contains 4 bits which control or contain information about the state of the Microcontroller Interface Chip gate array. The unused bits (7-4) are not implemented and will be read as 0's. Writing to the unused bits has no effect. The Control Register bits are described on the following page:

The Microcontroller Int aface Chip Control Register (CR) bits are defined as follows:

A14EN: A14EN controls whether A14 is output form port OP14 during SRAM accesses. This allows the upper 16k of a 32k×8 SRAM to be used.

1—A14 output on OP14.
0—A14 not output on OP14.
0 is the RESET_IN~ value.

WDOUT~: WDOUT~ reflects the value of the WDOUT~ signal from the COP888CF. WDOUT~ can be set/cleared in three ways:

1) set to 1 by writing a 1 to the WDOUT~ bit in the Control Register.
2) set to 1 by asserting the RESET_IN~ pin low.
3) cleared to 0 by asserting the WDOUT~ pin from the microcontroller. The COP888CF asserts a pulse when the WatchDog times out; it does not hold it.

RST~: The RST~ bit controls the RESET~ output to the COP888CF microcontroller. When RST~ is low, the COP888CF is held in reset and AT I/O cycles to the (DR), and SRAM accesses will complete with no wait states. When RST~ is high, the COP888CF will be executing code, and AT I/O cycles to the (DR) may have wait states inserted by IOCHRDY while the Microcontroller Interface Chip waits for the proper time in the COP888CF instruction cycle to access the SRAM.

1—the RESET~ output pin is driven high (deasserted)
0—the RESET~ output pin is driven low (asserted)
0 is the RESET_IN~ Value (the Microcontroller Interface Chip Reset)

CDONE: The Controller DONE bit is a handshake bit between the AT host and the COP888CF microcontroller. The COP888CF will set this bit to indicate that it has performed the action requested by the AT host. To indicate that it wants the COP888CF to perform an operation, the AT host should load a command into the SRAM, clear the CDONE bit, and poll the CDONE bit to see when the COP888CF has completed executing it. When the Microcontroller Interface Chip sees the CDONE bit has been cleared, it asserts INT (interrupt) to the COP888CF. The interrupt handling routine will fetch the command from SRAM, execute it, and then execute the set CDONE Exception Cycle setting the CDONE bit which deasserts the INT signal. The CDONE bit can be set/cleared in four ways:

1) Set when RESET_IN~ is asserted.
2) Set when MC_RST~ bit is asserted.
3) Set by the COP888CF via Exception Cycle.
4) Cleared by an AT I/O write of 0 to the CDONE bit.

Generic Chip Select (GCS): AT Address: h1EB Index: b100

An I/O read or write to this address will cause pin GCS~ (Generic Chip Select) to be asserted low while IOWC~ or IORC~ is asserted.

MILES COPS88CF Internal Only Registers

These registers are part of the serial interface to the COP888CF and are not directly accessible to the AT channel.

Internal Address High register (IAH): (No AT Address)

| X | A14 | A13 | A12 | A11 | A10 | A9 | A8 |

The Internal Address High register (IAH) contains the upper byte of the address the COP888CF shifted out of the D3 pin. This address will be combined with the IAL register and presented to the SRAM or AT Address Bus, depending on the cycle.

Internal Address Low register (IAL): (No AT Address)

| A7 | A6 | A5 | A4 | A3 | A2 | A1 | A0 |

The Internal Address Low register (IAL) contains the lower byte of the address the COP888CF shifted out of the D1 pin. This address will be combined with the IAH register and presented to the SRAM or AT Address Bus, depending on the cycle.

Internal Data Out register (IDOUT): (No AT Address)

| D7 | D6 | D5 | D4 | D3 | D2 | D1 | D0 |

The Internal Data Out register (IDOUT) is written with the COP888CF D-port data. It is serially shifted out of the D7 pin at the same time as the address. This data is the microcontroller output data for all microcontroller write cycles to the SRAM or AT channel.

Internal Data In register (IDIN): (No AT Address)

| D7 | D6 | D5 | D4 | D3 | D2 | D1 | D0 |

The Internal Data In register (IDIN) contains the byte of data that was read from the SRAM and will be shifted into the D0 pin of the COP888CF.

Internal Output Port High register (OPH): (OP Register)

| IO_M~ | OP14 | OP13 | OP12 | OP11 | OP10 | OP9 | OP8 |

The Internal Output Port High register (OPH) and the Internal Port Low register (OPL) and internal registers that are controlled by the C1 and C0 pins of the COP888CF C-port. On XLD, if C1=1, the data from the IDOUT register is latched into the OP register indicated by the C0 bit. The IO_M~ bit is a dedicated control bit. During Exception Cycles, it selects either 1) I/O read/write cycles or 2) SRAM Writes or Set CDONE Bit cycles. All the other bits are output on the OP[14:8] pins. When RESET_IN~ goes low, the OPH register is cleared to all zeros.

Internal Output Low register (OPL): (OP Register)

| OP7 | OP6 | OP5 | OP4 | OP3 | OP2 | OP1 | OP0 |

The Internal Output Port Low register (OPL) and the (IOH) register are internal registers that are controlled by the C1 and C0 pins of the COP888CF C-port. On XLD, if C1=1, the data from the IDOUT register is latched into the OP register indicated by the C0 pin. All the OPL bits are output on the OP[7:0] pins. When RESET_IN~ goes low, the OPL register is cleared to all zeros.

Internal Address Compare register (IAC): (No AT Address)

| A14 |
|---|

The Internal Address Compare register (IAC) is loaded with the value of the upper bit of the IAH register, bit 14, on COP888CF Exception Cycles. It is then compared with each subsequent cycle's bit 14 and will prevent the exception action (SRAM write for example) from repeating if there is a match. This will continue until the first compare fails, at which time normal operation will resume. The reason for this is to prevent multiple Exception Cycles from being generated erroneously. When the COP888CF generates a subroutine call to an address with bit 14 set, it will generate a read to that address. the Microcontroller Interface Chip will recognize this and jam a RET(urn from subroutine) instruction into the input data pin, D0, of the COP888CF. While the microcontroller is executing this instruction, it will continue to prefetch data from the location of the bogus subroutine. Since the Microcontroller Interface Chip will ignore these fetches, it will not generate additional Exception Cycles. While the IAC is active during Exception Cycles, the IAH and IAL bits 0–13 will be latched until A14 is cleared to prevent the AT address from changing during AT I/O Exception Cycles.

MILES Cycle Definition

MILES Slave I/O read/write cycles to MILES Registers (AT is Master)

MILES Slave I/O reads and writes to the Microcontroller Interface Chip Internal Interface Registers (IIR) are accomplished by accessing the AT Interface Registers at address h1EA and h1EB, using the appropriate index as was described above.

MILES Slave I/O read/write cycles to MILES SRAM (AT is Master)

When an AT device initiates an I/O read or write to the Microcontroller Interface Chip' SRAM, it must supply the appropriate indices to provide the memory address which will be latched in the AL and AH registers in the Microcontroller Interface Chip. These addresses are then passed to the SRAM. During the data phase of the cycle (when the DR is indexed), the AT state machine in the Microcontroller Interface Chip will immediately drive and hold IOCHRDY low until the SRAM is available for access by the AT device. IOCHRDY will then be released and the cycle completed. After every access to the DR, the AL is auto incremented in the Microcontroller Interface Chip. (NOTE: Data for slave cycles is never latched in the Microcontroller Interface Chip.) For no wait state reads or writes (i.e., loading SRAM with code or for executing a quick check sum on the SRAM), the RST~ bit should be asserted low prior to initiating the slave block reads or writes. When RST~ is asserted, the microcontroller will be held in reset so that the AT state machine in the Microcontroller Interface Chip will not drive IOCHRDY to insert waits.

Microcontroller Read from SRAM

When the COP888CF microcontroller reads from the SRAM, it generates the address via its D1 and D3 pins serially through the Microcontroller Interface Chip to the SRAM. The SRAM data will then be shifted serially out of the Microcontroller Interface Chip into the COP888CF via pin D0.

Microcontroller Write to OP Registers

When the COP888CF wants to write a value to the OPH or OPL registers, it should write that value to its D port into the Microcontroller Interface Chip IDOUT register. It should then write the appropriate control value to the C port. When XLD is asserted at the end of a microcontroller SRAM read cycle, if C1 of the C port is high, the 8-bit OP latch indicated by the C0 bit will be open. The input data for the OP registers is the IDOUT register. When XLD is deasserted, the latch will close and retain the data from the IDOUT register which is driven out the corresponding OP pins of the Microcontroller Interface Chip.

Microcontroller Exception Cycles

These are special cycles that are implemented by the Microcontroller Interface Chip. The COP888CF initiates an Exception Cycle by performing a subroutine call to the top 16K of its Program Memory Map; e.g., address bit 14 is set. the Microcontroller Interface Chip will recognize the address as an indication of an Exception cycle and stuff a RET(urn from subroutine) instruction into the IDIN register. the Microcontroller Interface Chip then takes whatever action is indicated by the exception during the next serial code fetch from the COP888CF.

To the COP888CF, it will appear that the first instruction of the routine is a return and it will pop the old PC off its internal stack and continue to execute instructions after the subroutine call.

Since the COP888CF takes 5 cycles to complete the RET instruction, and since it will prefetch instructions from the virtual subroutine it thought it jumped to, the Microcontroller Interface Chip will ignore all subsequent cycles to the exception space until it sees a microcontroller read from SRAM cycle. This will prevent the Microcontroller Interface Chip from taking erroneous exceptions while still allowing back-to-back Exception Cycles by the COP888CF code.

Exception Cycle Memory Map is as follows:

| IO_M~ | A14 | A13 | A12 | A11 | Action |
|---|---|---|---|---|---|
| 1 | 1 | 0 | X | X | Master I/O Read |
| 1 | 1 | 1 | X | X | Master I/O Write |
| 0 | 1 | 0 | X | X | SRAM Write |
| 0 | 1 | 1 | X | X | Set CDONE bit |
| X | 0 | X | X | X | SRAM Read |

IO_M~ is a control bit in bit 7 of the OPH register. It selects between: 1) I/O read/write cycles and 2) SRAM or Set CDONE Bit cycles. It is the microcontrollers' responsibility to set this bit to the proper value prior to initiating the Exception Cycle.

For ALL Exceptions Cycles, the COP888CF must first acquire the AT bus by asserting DMA_REQ (DMA request) and waiting for DMACK (DMA acknowledge). It must then assert MASTER~ for proper execution of the I/O cycle.

MILES Master I/O Read

During a MILES Master I/O Read from the AT bus, the microcontroller provides the address for the AT bus on the ten low-order bits of the Microcontroller Interface Chip IAH and IAL registers. The lower 13 address bits control where the data read from the AT bus will be stored in SRAM. The highest order bit, A14, indicates to the Microcontroller Interface Chip that this is an Exception Cycle and its decode, along with the IO_M~ bit from the OPH register, indicates which Exception Cycle. The AT data will flow directly into the SRAM without being latched in the Microcontroller Interface Chip. The microcontroller then accesses that data by reading the SRAM at the same location where the AT data was stored.

MILES Master I/O Write

During a MILES Master I/O Write to the AT bus, the microcontroller will shift the address into the Microcontroller Interface Chip IAH and IAL registers which will then drive the AT address. The AT bus state machine will write the data from the IDOUT register to the AT data bus. The COP888CF should have written the intended AT write data to its D-port before executing the Exception Cycle.

Microcontroller Write to SRAM

Address and data are shifted into the Microcontroller Interface Chip serially to generate the SRAM address and data. The Address is collected in the IAH and IAL registers as for reads, the Data is collected in the IDOUT register. The COP888CF should have written the intended AT write data to its D-port before executing the Exception Cycle. the Microcontroller Interface Chip will stuff a RET(urn from subroutine) instruction into the IDIN register and complete the write during execution of the RET.

Microcontroller Set CDONE Bit

When the Microcontroller Interface Chip detects a read to the address for the Set CDONE Bit Exception, it will cram a RET (return from subroutine) instruction into the IDIN register and set the CDONE Bit in the Control Register, also clearing the COP888CF Interrupt previously set when CDONE was cleared.

Sample Specific Circuit Implementation

The actual circuit implementation of the presently preferred embodiment will now be described in very great detail. However, it must be noted that the drawings shown are actual engineering drawings, and therefore include a great deal of detail. Most of the signal names on these drawings correspond to those discussed above, but the significance of the others will be readily apparent to those skilled in the art of digital design.

Figure 6:
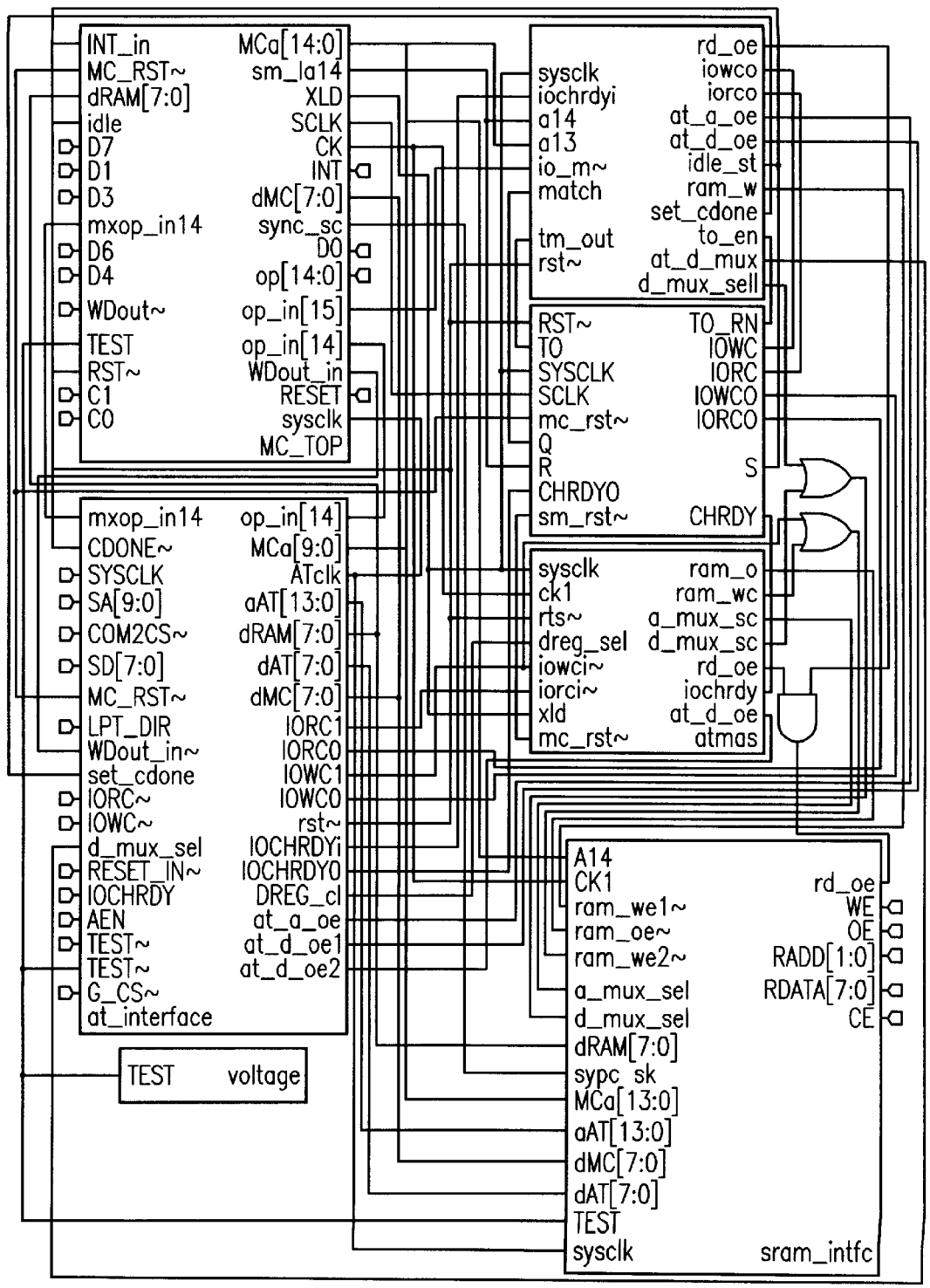
FIG. 6 is a diagram of the microcontroller interface chip, in the presently preferred embodiment. Note that this diagram is somewhat more detailed, in certain respects, than the diagram of FIG. 4.

FIG. 6 is a diagram of the microcontroller interface chip, in the presently preferred embodiment. Note that this diagram is somewhat more detailed, in certain respects, than the diagram of FIG. 4.

Figure 5A:
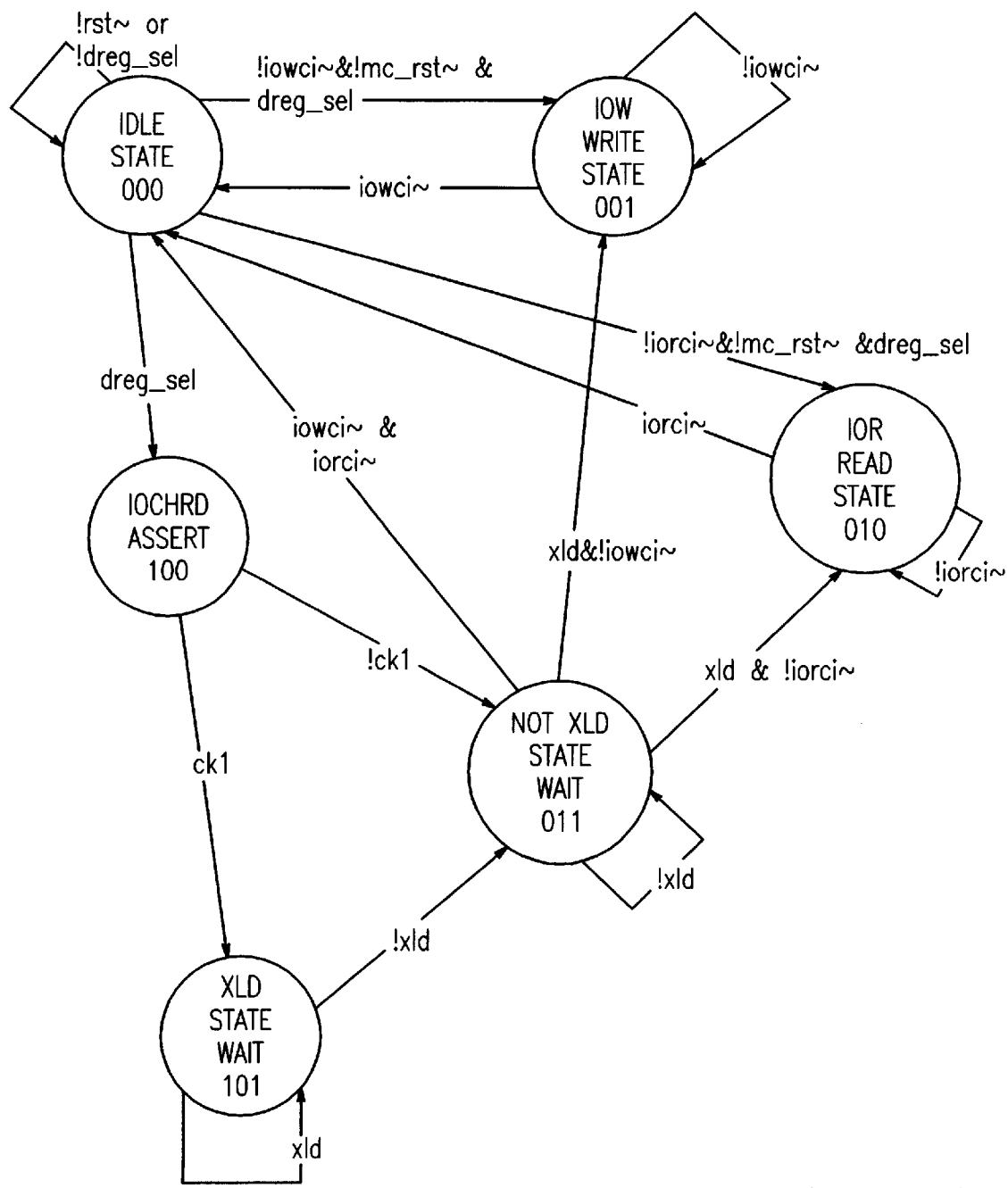
FIG. 5A is a state diagram which shows the operation of a first state machine, in operations where the microcontroller interface chip is accessing the system bus as slave.
Figure 5B:
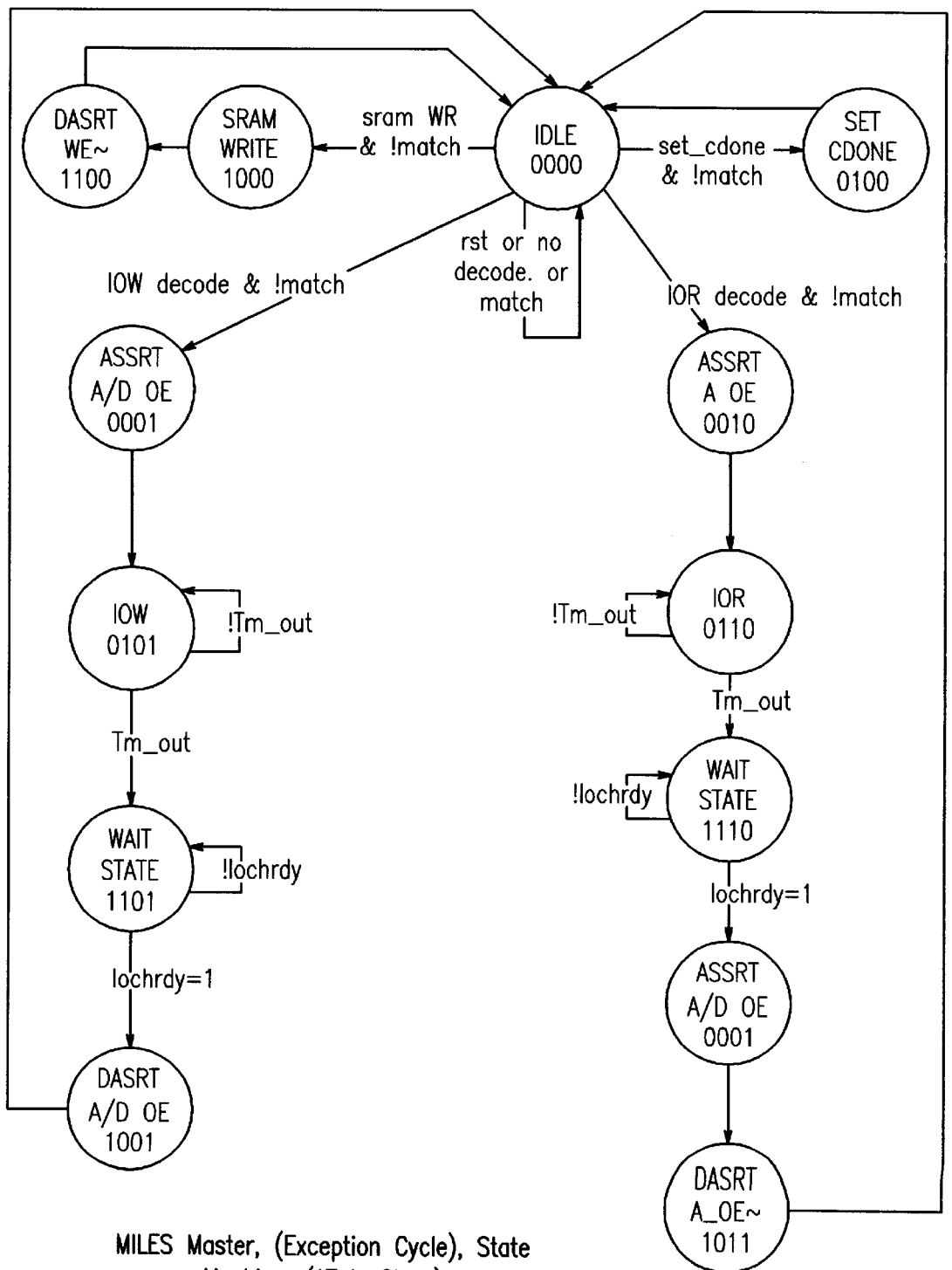
FIG. 5B is a state diagram which shows the operation of a second state machine, in operations where the microcontroller interface chip is accessing the system bus as master.
Figure 6B:
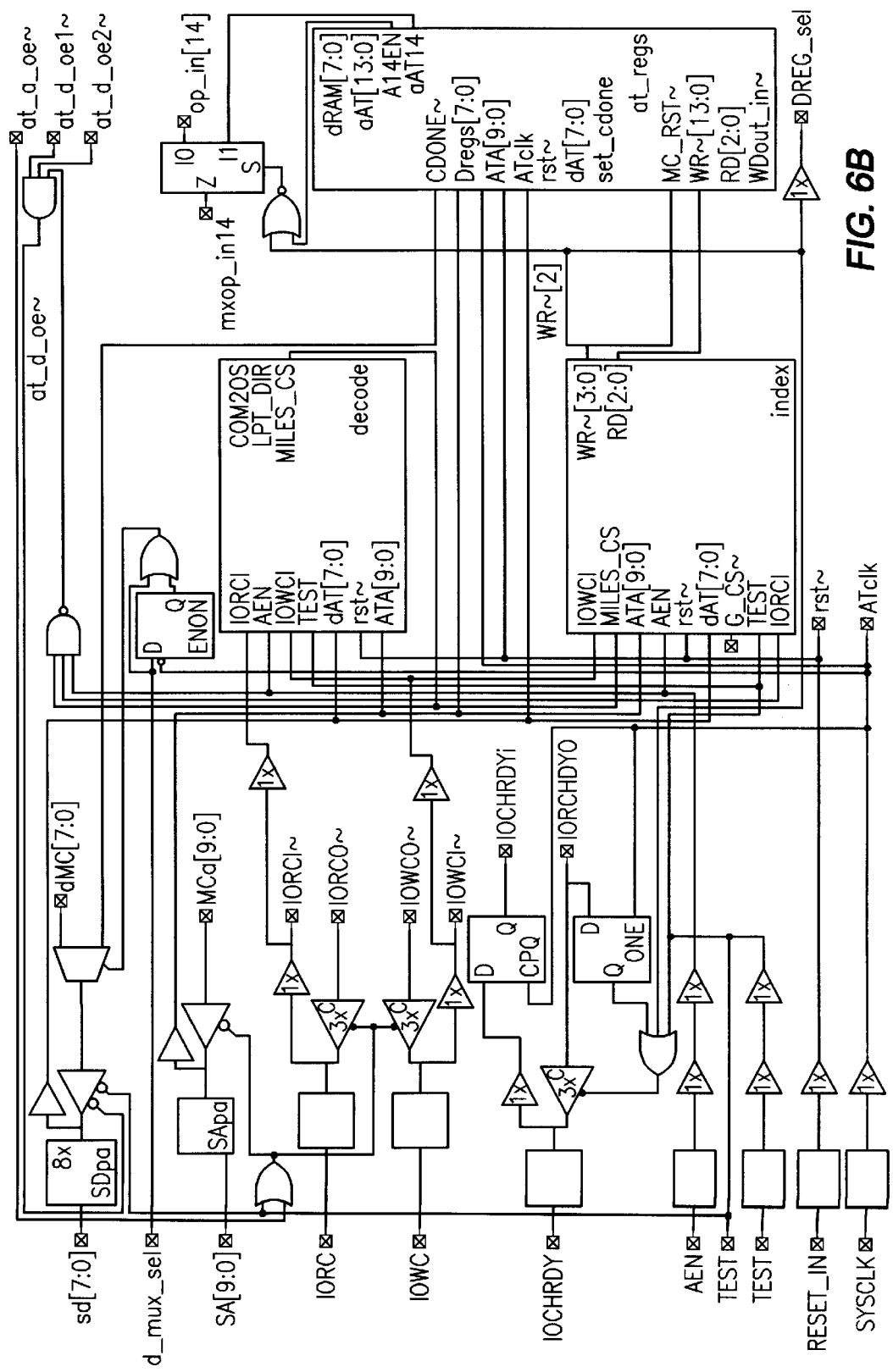
FIG. 6B is a diagram of the at_interface block shown in FIG. 6.

The at_interface block provides the interface to the AT bus, and is shown in more detail in FIG. 6B. The atmas block is a state machine, for accessing the AT bus as master, and corresponds to the state diagram of FIG. 5B. The atslv block is a state machine, for accessing the AT bus as slave, and corresponds to the state diagram of FIG. 5A. The misc_blk block is shown in detail in FIG. 6D. The MC_TOP block provides the interface to the microcontroller, and is shown in more detail in FIG. 6A.

FIG. 6A is a diagram of the MC_TOP block shown in FIG. 6, and FIG. 6A-1 is a diagram of the MC_intfc block shown in FIG. 6A. The block mc_pads merely represents pads and pad drivers. Block ret_mux8 is an 8-bit-wide multiplexer, which implements the return-cramming function: if line RET_SEL is low, data from the program memory will be selected; if line RET_SEL is high, data from the return crammer memory will be selected. Block cdata_reg is simply a double register, which multiplexes the in byte onto the a and b bytes. Blocks lat15 and lat8 are latches. Block sclk_cnt3 is a 3-bit counter, which counts 8 sclock signals and then generates a LEN signal on the folowing sclock edge. Block s2p_reg8 is simply a serial-to-parallel register, and p2s_blk is a parallel-to-serial converter. Block addr_sr is a shift register for address conversion.

FIG. 6B is a detailed diagram of the at_interface block shown in FIG. 6. Block decode is simply a decoder, which implements tests for signal values as described above. Block SDpad is an 8-bit bidirectional interface (with registers) to I/O pads, and block SApad is a simple 10-bit bidirectional pad interface. Block at_regs is simply a large collection of registers.

FIG. 6B-1 is a detailed diagram of the index block shown in FIG. 6B. This block shows the logical used to implement four WR~ bits, and the resulting Boolean relationships.

Figure 6C:
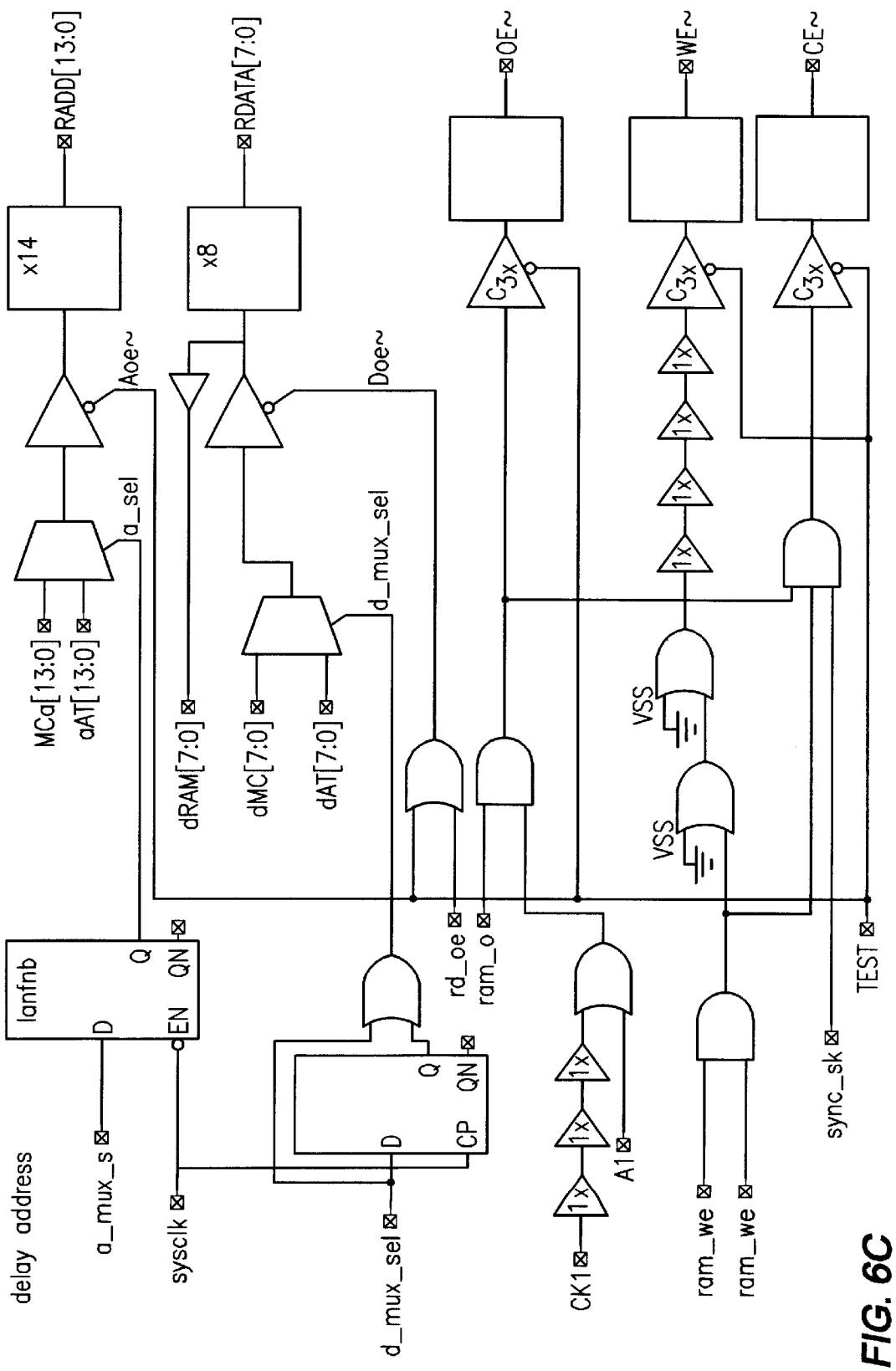
FIG. 6C is a diagram of the sram_intfc block shown in FIG. 6.

FIG. 6C is a detailed diagram of the sram_intfc block shown in FIG. 6, which implements the SRAM interface.

Figure 6D:
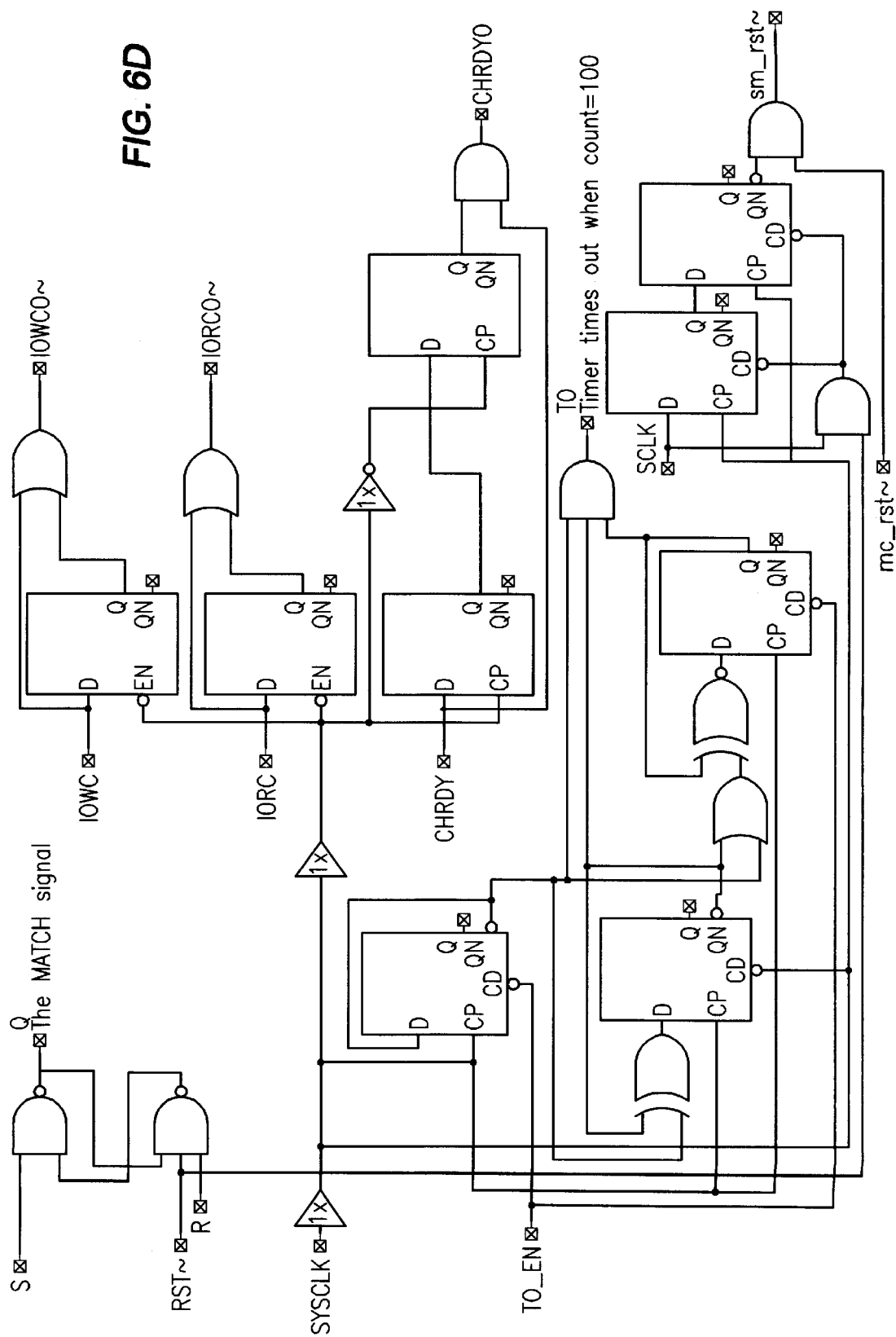
FIG. 6D is a diagram of the misc_blk block shown in FIG. 6.

FIG. 6D is a diagram of the misc_blk block shown in FIG. 6. Note that this includes a 3 bit binary counter which will time out about 375 ns after TO_EN is asserted.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

The presently preferred embodiments, as discussed above, use Intel microprocessor for the CPU. However, of course, the disclosed innovations can also be applied to systems using other non-Intel microprocessors of comparable architecture. The disclosed innovations can also be applied to other systems using other types of CPU, such as 680×0, SPARC, MIPS, or others. It is contemplated that, in the future, the disclosed innovations can also be applied to systems using a multiprocessor CPU.

The presently preferred embodiment relates to systems used in the ISA architecture. However, it is alternatively possible to adapt at least some of the disclosed teachings to other bus architectures, including not only the EISA bus architecture (which is an extension of ISA), but also the many other buses which are now in use or which may find use in the future.

The presently preferred embodiment uses Headland Technology and VTI chips for CPU support functions. However, of course, a wide variety of other chips are available to perform these functions, and many substitutions are possible. In particular, some microprocessors have been proposed with added support functions on-chip. For another example, compact modules incorporating a microprocessor with peripheral support functions are also available. A huge variety of such substitutions can be made, while still obtaining the benefits of the disclosed inventions.

Of course, many I/O and storage peripherals can be added into a laptop system. The disclosed innovations are generally applicable to such systems, regardless of what peripherals have or have not been added. Thus, for example, a laptop which contains a large bank of NVSRAM, or which is connected to an Ethernet adapter, or which includes speech recognition or synthesis, would still present many power-management issues similar to those discussed above.

For example, the principal disclosed embodiment, as presently practiced, does not include any available expansion slots for the user to add cards into. However, it is contemplated that addition of an expansion bus might be advantageous, and particularly so in combination with the microcontroller power-management architecture described above.

For another example, the principal disclosed embodiment, as presently practiced, never stops the system clock. In the 286 embodiment, the clock is slowed to 250 kHz, and in the SX embodiment the clock is slowed to 2 MHz. A fully static chip set, which would permit the system clock to be stopped would be even more advantageous; but, in the presently preferred embodiment, the HT21 chip and the SX chip are not compatible with fully static operation. Nevertheless, this is an obviously desirable modification, as the appropriate chipsets become available.

For another example, the principal disclosed embodiment, as presently practiced, uses Ni-Cd rechargeable batteries, and a small lithium cell as a nonrechargeable backup battery; but at least some of the disclosed innovative teachings can be practiced with other rechargeable battery technologies (such as NiH cells), if such technologies become commercially practicable, and/or can be practiced with nonrechargeable batteries in place of the NiCds of the preferred embodiment, and/or can be practiced with nonrechargeable batteries other than lithium cells.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. In a portable computer having multiple modes of operation including (1) a normal mode, in which a microprocessor within said computer operates at a predetermined clock speed, (2) a standby mode, in which some peripheral devices coupled to said computer are not allowed to operate at full power, and (3) a sleep mode, in which said microprocessor operates at a clock speed less than said predetermined clock speed and substantially all of said peripheral devices enter states of near-zero power consumption, a method of managing power, comprising the steps of:

sensing a length of time a mode select switch coupled to said computer is depressed; and entering a selectable one of said modes of operation as a function of said length of time said mode select switch is depressed.

2. The method as recited in claim 1 further comprising the step of entering a selectable one of said modes of operation as a function of a currently selected mode of operation.

3. The method as recited in claim 1 wherein said computer comprises a hinge joining a case to a cover, said cover depressing said switch when said case and cover are in a substantially closed position, said cover releasing said switch when said case and cover are in a substantially open position.

4. The method as recited in claim 3 wherein said switch is positioned proximate an axis of rotation of said hinge and cover depresses said switch by a camming action.

5. The method as recited in claim 3 wherein said cover is electrically coupled to said case by a flexible connection.

6. The method as recited in claim 5 wherein said cover is coupled to a display for said computer.

7. The method as recited in claim 1 further comprising the step of entering a selectable one of said modes of operation as a function of a length of time said computer remains in said normal mode.

8. A portable computer system, comprising:

a microprocessor CPU coupled to one or more input devices and one or more output devices;

a case and a cover, mated so that said case and said cover close together, and a button coupled to said case, positioned to be actuable by a user's digit, and also positioned to be actuated when said case and said cover are mated together;

said system having at least three modes of operation, including:

a normal mode in which said microprocessor is allowed to operate at a predetermined clock speed;

a standby mode in which at least one of said input and output devices is not allowed to operate at full power; and a sleep mode in which said microprocessor is not allowed to operate at said predetermined clock speed and substantially all of said input and output devices are powered down to a states of approximately zero power consumption;

said system being electronically connected and configured to enter said sleep mode from one of said normal and said standby modes when said button is pushed and held and to remain in said sleep mode for as long as said button is held in a depressed position; and to enter said standby mode from said normal mode when said button is pushed and immediately released; and to enter said normal mode from said standby mode when said button is pushed and immediately released.

9. The system of claim 8 wherein said case and said cover are joined together by a hinge structure and said button is positioned near an axis of rotation of said hinge so that said button is depressed by a camming action as said case and said cover are closed together.

10. The system of claim 8 wherein said case and said cover are joined together by a hinge structure and wherein said button comprises a lever having an exposed free end positioned near an axis of rotation of said hinge structure, so that said lever is depressed by a camming action as said case and said cover are closed together and wherein said button further comprises a switch which is not externally exposed but is positioned to be actuated by movement of said lever.

11. The system of claim 8 wherein all of said input and said output devices are powered down to states of approximately zero power consumption in said sleep mode.

12. The system of claim 8, wherein clock signals to said CPU can be stopped in said standby mode.

13. The system of claim 8, wherein said CPU is stopped in said standby mode.

14. The system of claim 8, wherein said CPU is completely powered down in said standby mode.

15. The system of claim 8, wherein software programs executed by said CPU include routines which cause said system to enter said sleep and standby modes.

16. The system of claim 8, further comprising a power-management microprocessor, separate from said CPU, which conditionally causes said system to enter said sleep, standby, and normal modes.

17. The system of claim 8, wherein said display is mounted in said cover, and said cover is electrically coupled to said case by a flexible connection.

18. A portable computer system, comprising:

a keyboard;

a case coupled to a cover, said case and said cover movably mounted together so that said case and said cover, when closed together, shield said keyboard between said case and said cover;

said case and cover enclosing:

a microprocessor CPU, one or more nonvolatile storage devices, a display, at least one battery pack, and a button, positioned to be actuable by a user's digit and also positioned to be actuated when said case and said cover are mated together, said system having at least three modes of operation, including:

a normal mode in which said microprocessor is allowed to operate at a predetermined clock speed and said display may be allowed to provide optimal output;

a standby mode in which at least one of said devices is not allowed to operate at full power; and a sleep mode in which said microprocessor is not allowed to operate at said predetermined clock speed and substantially all of said devices are powered down to a states of approximately zero power consumption;

said system being electronically connected and configured to enter said sleep mode from one of said normal and standby modes when said button is pushed and held and to remain in said sleep mode for as long as said button is held in a depressed position, to enter said standby mode from said normal mode when said button is pushed and immediately released, to enter said normal mode from said standby mode when said button is pushed and immediately released.

19. The system of claim 18 wherein said case and said cover are joined together by a hinge structure and said button is positioned near an axis of rotation of said hinge so that said button is depressed by a camming action as said case and said cover are closed together.

20. The system of claim 18 wherein said case and said cover are joined together by a hinge structure and wherein said button comprises a lever having an exposed free end positioned near an axis of rotation of said hinge structure, so that said lever is depressed by a camming action as said case and said cover are closed together and wherein said button further comprises a switch which is not externally exposed but is positioned to be actuated by movement of said lever.

21. The system of claim 18 wherein all of said input and said output devices are powered down to states of approximately zero power consumption in said sleep mode.

22. The system of claim 18, wherein said CPU is operated at a reduced clock speed in said standby mode.

23. The system of claim 18, wherein said CPU is stopped in said standby mode.

24. The system of claim 18, wherein said CPU is completely powered down in said standby mode.

25. The system of claim 18, wherein software programs executed by said CPU include routines which cause said system to enter said sleep and standby modes.

26. The system of claim 18, further comprising a power-management microprocessor, separate from said CPU, which conditionally causes said system to enter said sleep, standby, and normal modes.

27. The system of claim 18, wherein said display is mounted in said cover, and said cover is electrically coupled to said case by a flexible connection.

28. A method of operating a portable computer system which includes at least one microprocessor CPU, at least one input device, at least one output device, including a display, comprising the steps of:

selectably operating said system in any one of at least three modes of operation, said modes including:

a normal mode, in which said microprocessor is allowed to operate at a predetermined clock speed and said display is allowed to provide optimal output, a standby mode, in which at least one of said input and output devices is not allowed to operate at full power, and a sleep mode, in which said microprocessor is not allowed to operate at said predetermined clock speed and substantially all of said devices are powered down to a states of approximately zero power consumption;

entering said sleep mode from one of said normal and standby modes when a button, which is positioned to be actuable by a user's digit, and which is also positioned to be actuated when a mating case and cover, which enclose said microprocessor and said input device and said output device, are mated together, is pushed and held, said microprocessor remaining in said sleep mode for as long as said button is held in a depressed position;

entering said standby mode from said normal mode when said button is pushed and immediately released; and entering said normal mode from said standby mode when said button is pushed and immediately released.

29. The system of claim 28 wherein said case and said cover are joined together by a hinge structure and said button is positioned near an axis of rotation of said hinge so that said button is depressed by a camming action as said case and said cover are closed together.

30. The system of claim 28 wherein said case and said cover are joined together by a hinge structure and wherein said button comprises a lever having an exposed free end positioned near an axis of rotation of said hinge structure, so that said lever is depressed by a camming action as said case and said cover are closed together and wherein said button further comprises a switch which is not externally exposed but is positioned to be actuated by movement of said lever.

31. The system of claim 28 wherein all of said input and said output devices are powered down to states of approximately zero power consumption in said sleep mode.

32. The method of claim 28, wherein said CPU is operated at a reduced clock speed in said standby mode.

33. The method of claim 28, wherein said CPU is stopped in said standby mode.

34. A portable computer system, comprising:

a keyboard, a case and a cover, movably mounted together with a hinge so that said case and cover, when closed together, shield said keyboard between said case and said cover;

said case and cover also enclosing a microprocessor CPU, one or more nonvolatile storage devices, a display, at least one battery pack, and a button, comprising a lever having an exposed free end positioned near an axis of rotation of said hinge, so that said lever is depressed by a camming action as said case and said cover are closed together and so that said lever is positioned to be actuable by a user's digit when said cover is fully open; and also comprising a switch which is not externally exposed, but is positioned to be actuated by movement of said lever, said system being electrically connected and configured so that momentary actuation of said switch is interpreted as a user command regarding power management, and sustained actuation of said switch is interpreted as indicating that said user has closed said case and said cover together.

35. The system of claim 34, further comprising a power-management microprocessor, separate from said CPU, which conditionally causes said system to enter said sleep, standby, and normal modes.

36. The system of claim 34, wherein said display is mounted in said cover, and said cover is electrically coupled to said case by a flexible connection.

37. A portable computer system, comprising:

a microprocessor CPU, coupled to one or more input devices and one or more output devices;

a case and a cover, mated so that said case and cover close together, said case and said cover enclosing said microprocessor and at least some of said one or more input and output devices; and a button, positioned to be actuable by a user's digit and also positioned to be actuated when said case and said cover are mated together;

said system having at least two modes of operation, including:

a normal mode in which said microprocessor is allowed to operate at a predetermined clock speed, and an alternate mode in which at least one of said one or more input and output devices is not allowed to operate at full power, said system being electronically connected and configured to enter said alternate mode from said normal mode when said button is pushed and held and to remain in said alternate mode for as long as said button is held in a depressed position, to enter said alternate mode from said normal mode when said button is pushed and immediately released, and to enter said normal mode from said alternate mode when said button is pushed and immediately released.

38. The system of claim 37 wherein, in the alternate mode, said microprocessor is not allowed to operate at said predetermined clock speed and substantially all of said input and output devices are powered down to states of approximately zero power consumption.

\* \* \* \* \*